(12) United States Patent
Taguchi et al.

(10) Patent No.: US 7,311,392 B2
(45) Date of Patent: *Dec. 25, 2007

(54) INKJET RECORDING INK AND METHOD OF INKJET RECORDING

(75) Inventors: Toshiki Taguchi, Fujinomiya (JP); Akio Miyamoto, Fujionomiya (JP); Takashi Ozawa, Fujinomiya (JP); Manabu Ogawa, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/503,763

(22) PCT Filed: Feb. 6, 2003

(86) PCT No.: PCT/JP03/01251

§ 371 (c)(1),
(2), (4) Date: Jun. 6, 2005

(87) PCT Pub. No.: WO03/066755

PCT Pub. Date: Aug. 14, 2003

(65) Prior Publication Data

US 2006/0092248 A1 May 4, 2006

(30) Foreign Application Priority Data

| Feb. 8, 2002 | (JP) | ............................ 2002-032759 |
| Feb. 12, 2002 | (JP) | ............................ 2002-033983 |
| Feb. 12, 2002 | (JP) | ............................ 2002-034066 |
| Feb. 12, 2002 | (JP) | ............................ 2002-034364 |
| Feb. 13, 2002 | (JP) | ............................ 2002-035276 |

(51) Int. Cl.
*G01D 11/00* (2006.01)

(52) U.S. Cl. ..................... 347/100; 347/95; 106/31.27; 106/31.13

(58) Field of Classification Search .............. 347/100, 347/95, 96, 101, 102, 105; 523/160; 106/31.6, 106/31.27, 31.13; 428/195, 32.1

See application file for complete search history.

(56) References Cited

U.S. PATENT DOCUMENTS

| 3,287,470 A | 11/1966 | Geigy |
| 5,704,969 A | 1/1998 | Kanaya et al. |
| 5,882,390 A | 3/1999 | Nagai et al. |
| 6,241,789 B1 | 6/2001 | Scheibli et al. |
| 2002/0107301 A1* | 8/2002 | Yamanouchi et al. ....... 523/160 |
| 2003/0217671 A1* | 11/2003 | Ozawa ...................... 347/100 |
| 2005/0057629 A1* | 3/2005 | Taguchi et al. ............. 347/100 |
| 2005/0162492 A1* | 7/2005 | Taguchi et al. ............. 347/100 |
| 2005/0231574 A1* | 10/2005 | Ozawa ...................... 347/100 |

FOREIGN PATENT DOCUMENTS

| EP | 1270677 A2 | 1/2003 |
| EP | 1 364 994 A1 | 11/2003 |
| GB | 1356837 A | 6/1974 |
| JP | 7-188595 A | 7/1995 |
| JP | 2000-239584 A | 9/2000 |
| JP | 2002-285050 A | 10/2002 |
| JP | 2003-3109 A | 1/2003 |
| WO | WO 01/66648 A | 9/2001 |
| WO | WO 02/060994 A1 | 8/2002 |
| WO | WO 03/000811 A1 | 1/2003 |

OTHER PUBLICATIONS

International Search Report dated Mar. 6, 2003.
International Search Report for PCT/JP03/01251 dated Mar. 25, 2003.

* cited by examiner

*Primary Examiner*—Manish S. Shah
(74) *Attorney, Agent, or Firm*—Sughrue Mion Pllc.

(57) ABSTRACT

An inkjet recording ink including an aqueous medium having dissolved therein a phthalocyanine dye, wherein the phthalocyanine dye is a water-soluble dye having an oxidation potential more positive than 1.0 V (vs SCE) and the ink includes a water-miscible organic solvent having a vapor pressure of 2,000 Pa or less at 20° C.; and an inkjet recording method using the ink.

23 Claims, No Drawings

INKJET RECORDING INK AND METHOD OF INKJET RECORDING

TECHNICAL FIELD

The present invention relates to an inkjet recording ink capable of providing a high-quality recorded image, exhibiting excellent ejection durability even after long-term aging of the ink solution and ensuring excellent preservability of the obtained image under high-humidity condition, and also relates to an inkjet recording method using the ink.

BACKGROUND ART

Accompanying recent popularization of computers, an inkjet printer is widely used for printing letters or drawing an image on paper, film, cloth or the like not only at offices but also at homes.

The inkjet recording method includes a system of jetting out a liquid droplet by applying a pressure from a piezoelectric element, a system of jetting out a liquid droplet by generating a bubble in the ink under heat, a system of using an ultrasonic wave, and a system of jetting out a liquid droplet by suction using an electrostatic force. The ink used for such inkjet recording includes an aqueous ink, an oily ink and a solid (fusion-type) ink. Among these inks, an aqueous ink is predominating in view of production, handleability, odor, safety and the like.

The dye used in such an inkjet recording ink is required to have high solubility in a solvent, enable high-density recording, provide good color hue, exhibit excellent fastness to light, heat, air, water and chemicals, ensure good fixing to an image-receiving material and less bleeding, give an ink having excellent storability, have high purity and no toxicity, and be available at a low cost.

However, it is very difficult to find out a dye satisfying these requirements in a high level. In particular, a dye having good cyan color hue and excellent weather-resistant fastness is being keenly demanded.

Various dyes and pigments for inkjet recording have been already proposed and are actually used, but a dye satisfying all of the requirements is not yet found out at present. Conventionally well-known dyes and pigments having a color index (C.I.) number can hardly satisfy both color hue and fastness required of the ink for inkjet recording. As for the dye capable of improving the fastness, azo dyes derived from an aromatic amine and a heterocyclic 5-membered ring amine have been proposed in JP-A-55-161856 (the term "JP-A" as used herein means an "unexamined published Japanese patent application"). However, these dyes have a problem of bad color reproducibility due to undesirable color hue present in the yellow and cyan regions. JP-A-61-36362 and JP-A-2-212566 are disclosing an inkjet recording ink with an attempt to satisfy both color hue and light fastness. However, in use as a water-soluble ink, the dyes used in these patent publications are insufficient in the solubility in water. Also, when the dyes described in these patent publications are used as a water-soluble ink for inkjet recording, there arises a problem in the fastness to humidity and heat. In order to solve these problems, compounds and inks described in JP-T-11-504958 (the term "JP-T" as used herein means a "published Japanese translation of a PCT patent application") have been proposed. Furthermore, an inkjet recording ink using a pyrazolylaniline azo dye for improving the color hue and light fastness is described (see, Japanese Patent Application No. 2000-80733). However, these inkjet recording inks all are insufficient in the color reproducibility and fastness of the image output.

It has been also found that when an image is recorded on an inkjet special glossy paper for photographic image quality and put on a wall in a room, the image preservability is sometimes extremely bad. The present inventors assume that this phenomenon is ascribable to some oxidative gas in air, such as ozone. This phenomenon does not occur when the air flow is shut out, for example, by putting the image in a glass-made frame.

This phenomenon is outstanding particularly in the case of inkjet special glossy paper for photographic image quality and is a large problem for current inkjet recording systems where one of important characteristics is the photographic image quality.

Also, as described above, in preparing an ink solution, when only water is used, the penetrability into a medium is bad and the image is not fixed in many cases. In addition, the liquid properties necessary for hitting as an ink are often not satisfied. For solving these problems, a technique of using a water-miscible organic solvent as an auxiliary solvent is commonly employed in this field. However, mere use of a water-miscible organic solvent has been found to cause a problem that the image formed is readily blurred under high-humidity condition or the ejection stability is impaired due to drying of the ink at the inkjet head.

Accordingly, an object of the present invention is to provide an inkjet recording ink which is an aqueous ink in view of handleability, odor, safety and the like and which can ensure high ejection stability, good color hue of the obtained image, no drying of the ink at the inkjet head, excellent fastness to light and water, image quality free from defective such as fineline blurring under high-humidity condition, and good preservability of the image under severe conditions. Another object of the present invention is to provide an ink set capable of ensuring high storability and high ejection stability even after aging of the ink for a long time or under severe conditions.

DISCLOSURE OF THE INVENTION

The characteristic feature of the inkjet recording ink of the present invention is that an inkjet recording ink comprising an aqueous medium dissolved or dispersed therein a specific phthalocyanine dye described below contains a water-miscible organic solvent having a vapor pressure of 2,000 Pa or less at 20° C.

The characteristic feature of the method for producing an inkjet recording ink of the present invention is that the method for producing an inkjet recording ink comprises at least a step of adding sonic vibration and/or that in the method of producing an inkjet recording ink, the inkjet recording ink solution prepared is filtered through a filter having an effective pore diameter of 1 μm or less, defoamed and then used.

The above-described objects of the present invention can be attained by the following preferred techniques.

1. An inkjet recording ink comprising an aqueous medium dissolved or dispersed therein a phthalocyanine dye, wherein said phthalocyanine dye is a water-soluble dye having an oxidation potential more positive than 1.0 V (vs SCE) and the ink comprises a water-miscible organic solvent having a vapor pressure of 2,000 Pa or less at 20° C.

2. The inkjet recording ink as described in 1, which comprises at least one organic solvent having a boiling point of 150° C. or more as the water-miscible organic solvent.

3. The inkjet recording ink as described in 2, wherein the at least one organic solvent having a boiling point of 150° C. or more is an alcohol derivative.

4. The inkjet recording ink as described in 1, which comprises at least one organic solvent having a boiling point of less than 150° C. as the water-miscible organic solvent.

5. The inkjet recording ink as described in 4, wherein the at least one organic solvent having a boiling point of less than 150° C. is an alcohol derivative.

6. The inkjet recording ink as described in 1, which comprises a polyhydric alcohol and/or a derivative thereof as the water-miscible organic solvent.

7. The inkjet recording ink as described in 6, which comprises a mixture of two or more members containing the polyhydric alcohol and/or a derivative thereof.

8. The inkjet recording ink as described in 6 or 7, which comprises the polyhydric alcohol and/or a derivative thereof at a concentration of 10 to 60 (mass/volume) %.

9. The inkjet recording ink as described in 1, which comprises an organic solvent, in which the phthalocyanine dye has a solubility of 10 (g/100 g-solvent) or more at 25° C., as the water-miscible organic solvent.

10. The inkjet recording ink as described in 9, which comprises a water-miscible organic solvent, in which the phthalocyanine dye has a solubility of 10 (g/100 g-solvent) or more at 25° C., in an amount of 10 mass % or less in the ink.

11. The inkjet recording ink as described in 1, which comprises an organic solvent, which is liquid at ordinary temperature and does not contain a heteroatom other than an oxygen atom, as the water-miscible organic solvent.

12. The inkjet recording ink as described in 11, wherein the organic solvent has a boiling point of 150° C. or more.

13. The inkjet recording ink as described in 11 or 12, wherein the organic solvent is an alcohol derivative and is selected from a monool, a diol and a triol.

14. The inkjet recording ink as described in 1, wherein the water content is from 40 to 80 mass % based on the ink solution.

15. The inkjet recording ink as described in any one of 1 to 14, wherein when the monochromatic moiety printed by using a single (cyan) color of the ink so as to give a cyan reflection density of 0.9 to 1.1 in a Status A filter is stored in an ozone environment of 5 ppm for 24 hours, a dye residual ratio (density after color fading/initial density×100) is 60% (preferably 80%) or more.

16. The inkjet recording ink as described in any one of 1 to 15, wherein after color fading with ozone under the conditions of claim 15, the amount of Cu ion flowed out into water is 20% or less of all dyes.

17. The inkjet recording ink as described in any one of 1 to 16, wherein the phthalocyanine dye is a water-soluble dye having an electron-withdrawing group at the β-position of a benzene ring of said phthalocyanine.

18. The inkjet recording ink as described in any one of 1 to 17, wherein said phthalocyanine dye is a water-soluble phthalocyanine dye produced by a process not passing through sulfonation of an unsubstituted phthalocyanine.

19. The inkjet recording ink as described in 1 to 18, wherein said phthalocyanine dye is represented by the following formula (I):

Formula (I):

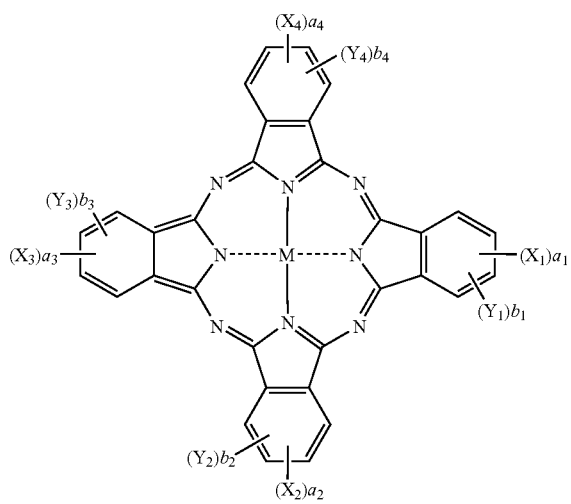

wherein $X_1$, $X_2$, $X_3$ and $X_4$ each independently represents —SO-Z, —SO$_2$-Z, —SO$_2$NR1R2, a sulfo group, —CONR1R2 or —CO$_2$R1;

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, these may be the same or different, $Y_1$, $Y_2$, $Y_3$ and $Y_4$ each independently represents a monovalent substituent, provided that when a plurality of $X_1$s, $X_2$s, $X_3$s, $X_4$s, $Y_1$s, $Y_2$s, $Y_3$s or $Y_4$s are present, these may be the same or different, $a_1$ to $a_4$ and $b_1$ to $b_4$ represent the number of substituents $X_1$ to $X_4$ and $Y_1$ to $Y_4$, respectively, $a_1$ to $a_4$ each independently represents an integer of 0 to 4 but all are not 0 at the same time, $b_1$ to $b_4$ each independently represents an integer of 0 to 4, and M represents a hydrogen atom, a metal atom or an oxide, hydroxide or halide thereof.

20. The inkjet recording ink as described in 19, wherein the dye represented by formula (I) is a dye represented by the following formula (II):

Formula (II):

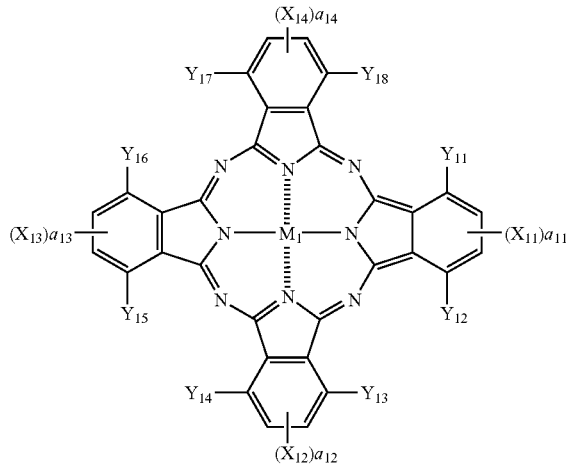

wherein $X_{11}$ to $X_{14}$, $Y_{11}$ to $Y_{18}$ and $M_1$ have the same meanings as $X_1$ to $X_4$, $Y_1$ to $Y_4$ and M in formula (I), respectively, and $a_{11}$ to $a_{14}$ each independently represents an integer of 1 or 2.

21. An inkjet recording method comprising using the inkjet recording ink described in 1 to 20.

22. An inkjet recording method comprising ejecting ink droplets according to recording signals on an image-receiving material comprising a support having thereon an image-receiving layer containing a white inorganic pigment particle, thereby recording an image on the image-receiving material, wherein said ink droplet comprises the inkjet recording ink described in 1 to 20.

BEST MODE FOR CARRYING OUT THE INVENTION

The present invention is described in detail below.

As a result of intensive investigations on the inkjet recording ink, the present inventors have found that the properties required of the dye are 1) to give a good color hue and be free of change in the color hue (chromism of solvate), 2) to exhibit excellent fastness (to light, ozone, NOx, solvent, oil and water), 3) to be safe (not carcinogenic by AMES, not irritating to skin and easily degradable), 4) to be inexpensive, 5) to have high ε, 6) to be highly soluble, and 7) to have strong fixing property to a medium.

The properties required of the ink and conc. ink are 1) to be uniform irrespective of the temperature and aging, 2) to be less contaminated, 3) to exhibit good penetration into a medium, 4) to be uniform in the hitting size, 5) to be usable for all types of paper, 6) to be easily prepared, 7) to ensure no ejection error, less bubbling and easy defoaming, and 8) to be stably ejected.

The properties required of the image is 1) to be clear without blurring, discoloration and beading, 2) to have scratch resistance, 3) to have high and uniform gloss, 4) to have good image preservability and excellent balance in color fading, 5) to be quickly dried, 6) to be printed at a high speed, and 7) to have no image density dependency in the color fading ratio.

The properties required of the inkjet recording ink is to be excellent in both light fastness and ozone resistance and small in the change of color hue and surface state (less generation of bronze and less precipitation of dye). As for the light fastness (OD1.0), the light fastness with a TAC filter on Epson PM Photographic Image-Receiving Paper by Xe of 1.1 W/m (intermittent conditions) is preferably 90% or more in terms of the residual color ratio for 3 days. Also, the dye residual ratio for 14 days is preferably 85% or more. As for the ozone resistance, the ozone resistance (OD1.0) under the condition of 5 ppm or less of ozone is preferably 60% or more, more preferably 70% or more, still more preferably 80% or more, in terms of the dye residual ratio for one day. Also, the dye residual ratio for 5 days is preferably 25% or more, more preferably 40% or more, still more preferably 50% or more. Samples varied in the coated amount of the dye are prepared by GTC and the amount of Cu element contained in the dye is measured by a fluorescent X ray.

The Cu ion is present in the form of a phthalate as a result of decomposition of a phthalocyanine dye. The amount of the Cu salt present in an actual print is preferably 10 mg/m² or less in terms of Cu ion. The amount of Cu flowed out from the print is determined by forming an entire cyan solid image having a Cu salt amount of 20 mg/m² or less in terms of Cu ion, color-fading this image with ozone and analyzing the amount of ion flowed out into water. Incidentally, all Cu compounds are trapped by the image-receiving material before the color fading. The amount of Cu ion flowed out into water is preferably 20% or less of all dyes.

It has been found by the present invention that a phthalocyanine dye having such properties can be obtained, for example, by 1) elevating the oxidation potential, 2) enhancing the aggregation property, 3) introducing an aggregation accelerating group, intensifying the hydrogen bond at the time of π-π stacking, or 4) not incorporating a substituent at the α-position, that is, facilitating the stacking.

Conventional phthalocyanine dyes used for the inkjet ink are derived from an unsubstituted phthalocyanine through sulfonation and these are a mixture which cannot be specified in the number and positions of substituents. On the other hand, the dye for use in the inkjet recording ink of the present invention is a phthalocyanine dye which can be specified in the number and positions of substituents. The first structural feature is that the dye is a water-soluble phthalocyanine dye obtained by not passing through sulfonation of an unsubstituted phthalocyanine. The second structural feature is that the dye has an electron-withdrawing group at the β-position of a benzene ring of phthalocyanine, preferably at the β-position of all benzene rings. Specific examples of useful dyes include those where a sulfonyl group is substituted (see, Japanese Patent Application Nos. 2001-47013 and 2001-190214), a sulfamoyl group in general is substituted (see, Japanese Patent Application Nos. 2001-24352 and 2001-189982), a heterocyclic sulfamoyl group is substituted (see, Japanese Patent Application Nos. 2001-96610 and 3001-190216), a heterocyclic sulfonyl group is substituted (see, Japanese Patent Application Nos.

2001-76689 and 2001-190215), a specific sulfamoyl group is substituted (see, Japanese Patent Application No. 2001-57063), a carbonyl group is substituted (see, Japanese Patent Application No. 2002-012869), or a specific substituent for enhancing the solubility or ink stability or preventing the bronze phenomenon, such as asymmetric carbon (see, Japanese Patent Application No. 2002-012868) or Li salt (see, Japanese Patent Application No. 2002-012864), is substituted.

The first physical feature of the dye for use in the inkjet recording ink of the present invention is to have a high oxidation potential. The oxidation potential is preferably more positive than 1.00 V, more preferably more positive than 1.1 V, and most preferably more positive than 1.2 V. The second physical feature is to have a strong aggregation property. Specific examples of the dye having this property include those where the aggregation of oil-soluble dyes is specified (see, Japanese Patent Application No. 2001-64413) or the aggregation of water-soluble dyes is specified (see, Japanese Patent Application No. 2001-117350).

With respect to the relationship between the number of aggregating groups and the performance (light absorbance of ink), when an aggregating group is introduced, reduction of light absorbance or shifting of λmax to the shorter wave is liable to occur even in a dilute solution. With respect to the relationship between the number of aggregating groups and the performance (reflection OD on Epson PM920 Image-Receiving Paper), as the number of aggregating groups increases, the reflection OD at the same ion intensity more decreases. That is, the aggregation is considered to proceed on the image-receiving paper. With respect to the relationship between the number of aggregating groups and the performance (ozone resistance/light fastness), as the number of aggregating groups increases, the ozone resistance is more enhanced. A dye having a large number of aggregating groups tends to be enhanced also in the light fastness. In order to impart the ozone resistance, the above-described substituent X (which represents $X_1$, $X_2$, $X_3$, $X_4$ or the like) must be present. The reflection OD and the fastness are in the trade-off relationship and therefore, it is necessary to enhance the light fastness without weakening the aggregation.

Preferred embodiments of the ink of the present invention are:

1) a cyan ink where the light fastness with a TAC filter on Epson PM Photographic Image-Receiving Paper by Xe of 1.1 W/m (intermittent conditions) is 90% or more in terms of the residual color ratio for 3 days;

2) a cyan ink where after storage in an ozone environment of 5 ppm for 24 hours, the monochromatic moiety printed by using a single (cyan) color of the ink to give a cyan reflection density of 0.9 to 1.1 in a Status A filter has a dye residual ratio (density after color fading/initial density×100) of 60% (preferably 80%) or more;

3) a cyan ink where after color fading with ozone under the conditions of 2 above, the amount of Cu ion flowed out into water is 20% or less of all dyes; and 4) a cyan ink having penetrability such that the amount of ink penetrated into a specific image-receiving paper is 30% or more of the upper portion of the image-receiving layer.

The dye contained in the inkjet recording ink of the present invention is a phthalocyanine dye, preferably a water-soluble dye having an oxidation potential more positive than 1.0, more preferably a dye having ozone gas fastness satisfying the above-described conditions, still more preferably a phthalocyanine dye represented by formula (I).

The phthalocyanine dye is a dye having fastness but this dye is known to be inferior in the fastness to ozone gas when used as a dye for inkjet recording.

In the present invention, an electron-withdrawing group is preferably introduced into the phthalocyanine skeleton to render the oxidation potential more positive than 1.0 V (vs SCE) and thereby reduce the reactivity with ozone which is an electrophilic agent. A more positive oxidation potential is more preferred and the oxidation potential is more preferably more positive than 1.1 V (vs SCE) and most preferably more positive than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho (Electrochemical Measuring Method)*, Gihodo Shuppan Sha (1984).

More specifically, a test sample is dissolved to a concentration of $1\times10^{-4}$ to $1\times10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry. This value sometimes deviates on the order of tens of millivolt due to the effect of, for example, liquid junction potential or liquid resistance of sample solution, but the reproducibility of potential can be guaranteed by adding a standard sample (for example, hydroquinone).

In order to univocally specify the potential, in the present invention, the value (vs SCE) measured in a dimethylformamide (concentration of dye: 0.001 mol $dm^{-3}$) containing 0.1 mol $dm^{-3}$ of tetrapropylammonium perchlorate as the supporting electrolyte is used as the oxidation potential of the dye.

The Eox (oxidation potential) value indicates the transferability of an electron from the sample to the electrode and as the value is larger (the oxidation potential is more positive), the electron is less transferable from the sample to the electrode, in other words, the oxidation less occurs. As for the relationship with the structure of compound, the oxidation potential becomes more positive when an electron-withdrawing group is introduced, and becomes more negative when an electron-donating group is introduced. In the present invention, the oxidation potential is preferably rendered more positive by introducing an electron-withdrawing group into the phthalocyanine skeleton so as to reduce the reactivity with ozone which is an electrophilic agent. When the Hammett's substituent constant σp value as a measure for the electron-withdrawing property or electron-donating property of substituent is used, the oxidation potential can be rendered more positive by introducing a substituent having a large σp value, such as sulfinyl group, sulfonyl group and sulfamoyl group.

Also for the purpose of such potential control, the phthalocyanine dye represented by formula (I) is preferably used.

The phthalocyanine dye having the above-described oxidation potential is apparently a cyanine dye excellent in both the light fastness and the ozone resistance, because this dye satisfies those conditions for light fastness and ozone resistance.

The phthalocyanine dye (preferably the phthalocyanine dye represented by formula (I)) for use in the present invention is described in detail below.

In formula (I), $X_1$, $X_2$, $X_3$ and $X_4$ each independently represents —SO-Z, —$SO_2$-Z, —$SO_2$NR1R2, a sulfo group, —CONR1R2 or —$CO_2$R1. Among these substituents, preferred are —SO-Z, —$SO_2$-Z, —$SO_2$NR1R2 and —CONR1R2, more preferred are —$SO_2$-Z and —$SO_2$NR1R2, and most preferred is —$SO_2$-Z. In the case where $a_1$ to $a_4$ showing the number of substituents each represents a number of 2 or more, a plurality of substituents $X_1$, $X_2$, $X_3$ or $X_4$ may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —$SO_2$-Z and Zs are different from each other, or may include substituents differing from each other, for example, —$SO_2$-Z and —$SO_2$NR1R2.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, more preferably a hydrogen atom, a substituted alkyl group, a substituted aryl group or a substituted heterocyclic group. However, it is not preferred that R1 and R2 both are a hydrogen atom.

The substituted or unsubstituted alkyl group represented by R1, R2 and Z is preferably an alkyl group having from 1 to 30 carbon atoms, more preferably a branched alkyl group because the solubility of dye and the stability of ink are improved, still more preferably an alkyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkyl group may be substituted by a halogen atom or an ionic hydrophilic group. Incidentally, the number of carbon atoms in the alkyl group does not contain carbon atoms of substituents and this applies to other groups.

The substituted or unsubstituted cycloalkyl group represented by R1, R2 and Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by R1, R2 and Z is preferably an alkenyl group having from 2 to 30 carbon atoms, more preferably a branched alkenyl group because the solubility of dye and the stability of ink are improved, still more preferably an alkenyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by R1, R2 and Z is preferably an aralkyl group having from 7 to 30 carbon atoms, more preferably a branched aralkyl group because the solubility of dye and the stability of ink are improved, still more preferably an aralkyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by R1, R2 and Z is preferably an aryl group having from 6 to 30 carbon atoms. Examples of the substituent include those described later as the substituent when Z, R1, R2, $Y_1$, $Y_2$, $Y_3$ and $Y_4$ can further have a substituent. In particular, an electron-withdrawing group is preferred because the dye can have a noble oxidation potential and can be improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by R1, R2 and Z is preferably a 5- or 6-membered ring and the ring may be further condensed. Also, the heterocyclic group may be an aromatic heterocyclic group or a non-aromatic heterocyclic group. Examples of the heterocyclic group represented by R1, R2 and Z are shown below in the form of a heterocyclic ring by omitting the substitution site. The substitution site is not limited and, for example, in the case of pyridine, the 2-position, 3-position and 4-position can be substituted. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, R1, R2, $Y_1$, $Y_2$, $Y_3$ and $Y_4$ can further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These groups each may further have a substituent.

$Y_1$, $Y_2$, $Y_3$ and $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, R1, R2, $Y_1$, $Y_2$, $Y_3$ and $Y_4$ each is a group which can further have a substituent, the group may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (I) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represents an integer of 0 to 4 but all are not 0 at the same time. $b_1$ to $b_4$ each independently represents an integer of 0 to 4. When $a_1$, $a_2$, $a_3$, $a_4$, $b_1$, $b_2$, $b_3$ or $b_4$ represents an integer of 2 or more, a plurality of $X_1$s, $X_2$s, $X_3$s, $X_4$s, $Y_1$s, $Y_2$s, $Y_3$s or $Y_4$s are present and these may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining two or more of these groups.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (I), a phthalocyanine dye having a structure represented by formula (II) is preferred. The phthalocyanine dye represented by formula (II) of the present invention is described in detail below.

In formula (II), $X_{11}$ to $X_{14}$ and $Y_{11}$ to $Y_{18}$ have the same meanings as $X_1$ to $X_4$ and $Y_1$ to $Y_4$ in formula (I), respectively, and preferred examples are also the same. $M_1$ has the same meaning as M in formula (I) and preferred examples are also the same.

In formula (II), $a_{11}$ to $a_{14}$ each independently represents an integer of 1 or 2 and preferably satisfy $4 \leq a_{11}+a_{12}+a_{13}+a_{14} \leq 6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —$SO_2$-Z and Zs are different from each other, or may include substituents different from each other, for example, —$SO_2$-Z and —$SO_2$NR1R2.

In the phthalocyanine dye represented by formula (II), the following combinations of substituents are particularly preferred.

$X_{11}$ to $X_{14}$ each independently represents preferably —SO-Z, —$SO_2$-Z, —$SO_2$NR1R2 or —CONR1R2, more preferably —$SO_2$-Z or —$SO_2$NR1R2, and most preferably —$SO_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

R1 and R2 each independently represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group. However, it is not preferred that R1 and R2 both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{18}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is more preferred that all are 1.

$M_1$ represents a hydrogen atom, a metal element or an oxide, hydroxide or halide thereof, preferably Cu, Ni, Zn or Al, and most preferably Cu.

In the case where the phthalocyanine dye represented by formula (II) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

As for the preferred combination of substituents in the compound represented by formula (II), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron-withdrawing group such as sulfinyl group, sulfonyl group and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described here. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki (Chemistry Region)*, special number, No. 122, pp. 96-103, Nankodo (1979).

Inevitably in view of the synthesis method, the phthalocyanine derivative represented by formula (I) is generally a mixture of analogues differing in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (I) and (II) are defined by classifying these into the following three types based on the substitution site.

(1) β-Position Substitution Type:

A phthalocyanine dye having specific substituents at the 2- and/or 3-position, the 6- and/or 7-position, the 10- and/or 11-position, and the 14- and/or 15-position.

(2) α-Position Substitution Type:

A phthalocyanine dye having specific substituents at the 1- and/or 4-position, the 5- and/or 8-position, the 9- and/or 12-position, and the 13- and/or 16-position.

(3) α,β-Position Mixed Substitution Type:

A phthalocyanine dye having specific substitutions at the 1- to 16-positions without any regularity.

In the present invention, phthalocyanine dye derivatives differing in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine—Kagaku to Kino— (Phthalocyanine—Chemistry and Function—)*, pp. 1-62, IPC, and C. C. Leznoff and A. B. P. Lever, *Phthalocyanines—Properties and Applications*, pp. 1-54, VCH, or methods analogous thereto.

The phthalocyanine compound represented by formula (I) of the present invention can be synthesized, for example, through sulfonation, sulfonyl chloridation or amidation reaction of an unsubstituted phthalocyanine compound as described in International Publications 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the positions and number of sulfo groups introduced into the product cannot be specified and a mixture of those differing in the number of substituents or in the substitution site inevitably results. If the compound of the present invention is synthesized starting from such a product, the compound of the present invention is obtained as an α,β-position mixed substitution type mixture containing several kinds of compounds differing in the number of substituents or in the substitution site because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes more positive and the ozone resistance is increased. However, according to the above-described synthesis method, a phthalocyanine dye where the number of electron-withdrawing groups introduced is small, namely, the oxidation potential is more negative, is inevitably mingled. Therefore, in order to improve the ozone resistance, it is preferred to use a synthesis method where the production of a compound having a more negative oxidation potential is suppressed.

The phthalocyanine compound represented by formula (II) of the present invention can be synthesized, for example, by reacting a phthalonitrile derivative (Compound P) shown below and/or a diiminoisoindoline derivative (Compound Q) shown below with a metal derivative represented by formula (III) or can be derived from a tetrasulfophthalocyanine compound obtained by reacting a 4-sulfophthalonitrile derivative (Compound R) shown below with a metal derivative represented by formula (III).

In the formulae above, $X_p$ corresponds to $X_{11}$, $X_{12}$, $X_{13}$ or $X_{14}$ in formula (II) and $Y_q$ and $Y_q'$ each corresponds to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents cation.

Examples of the cation represented by M' include alkali metal ions such as Li, Na and K, and organic cations such as triethylammonium ion and pyridinium ion.

Formula (III):

$$M-(Y)_d$$

wherein M has the same meaning as M in formulae (I) and (II), Y represents a monovalent or divalent ligand such as halogen atom, acetate anion, acetylacetonate and oxygen, and d represents an integer of 1 to 4.

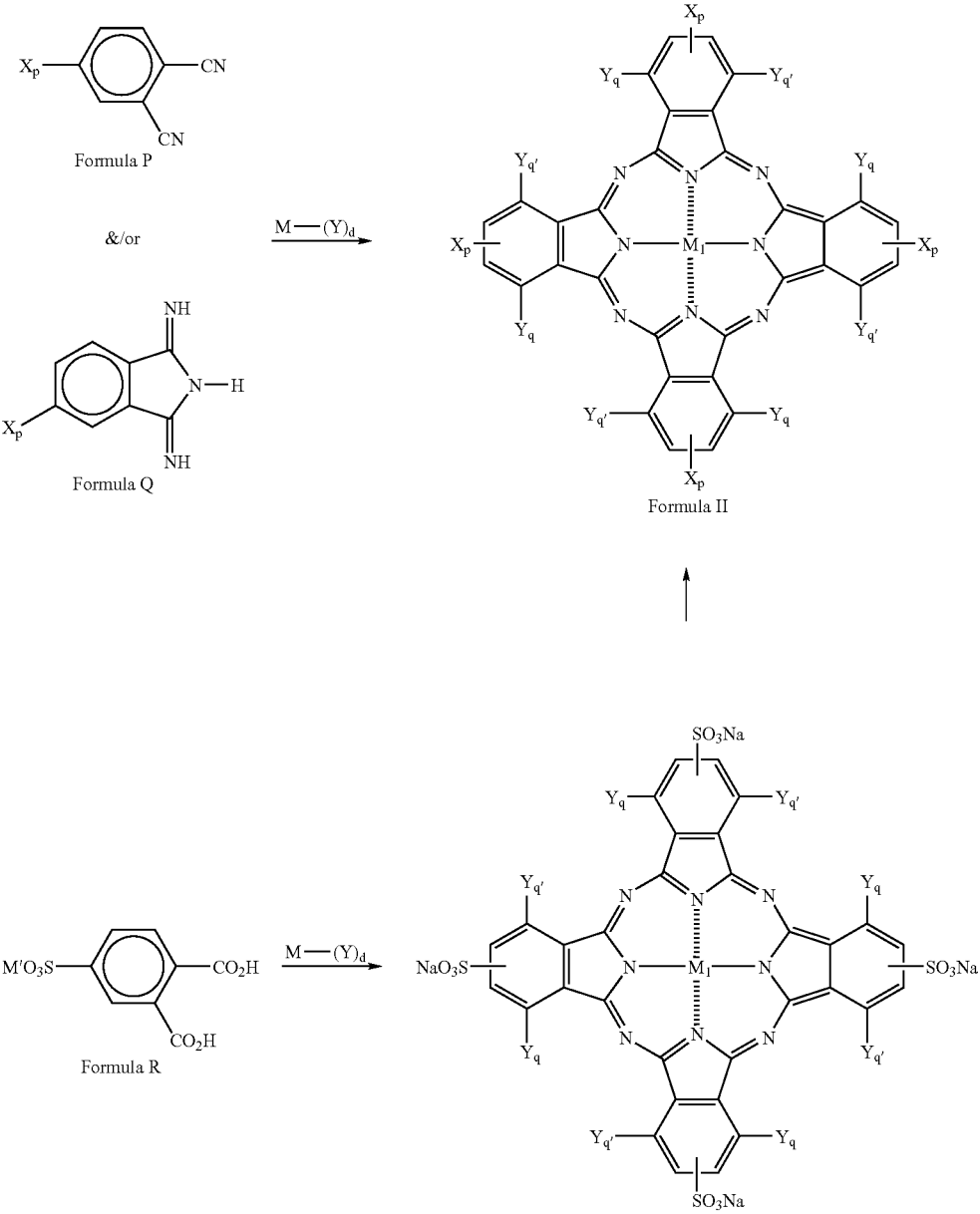

That is, according to this synthesis method, a specific number of desired substituents can be introduced. Particularly, in the case of introducing a large number of electron-withdrawing groups so as to render the oxidation potential more positive as in the present invention, this synthesis method is very excellent as compared with the above-described method for synthesizing the phthalocyanine compound of formula (I).

The thus-obtained phthalocyanine compound represented by formulae (II) is usually a mixture of compounds represented by the following formulae (a)-1 to (a)-4 which are isomers with respect to the substitution site of each $X_p$, namely, a β-position substitution type.

Formula (a)-1:

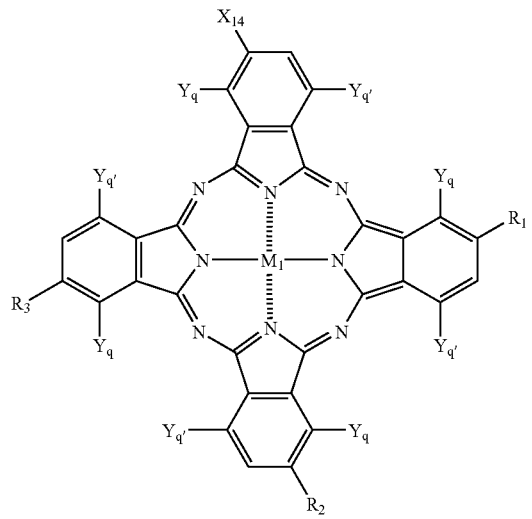

Formula (a)-2:

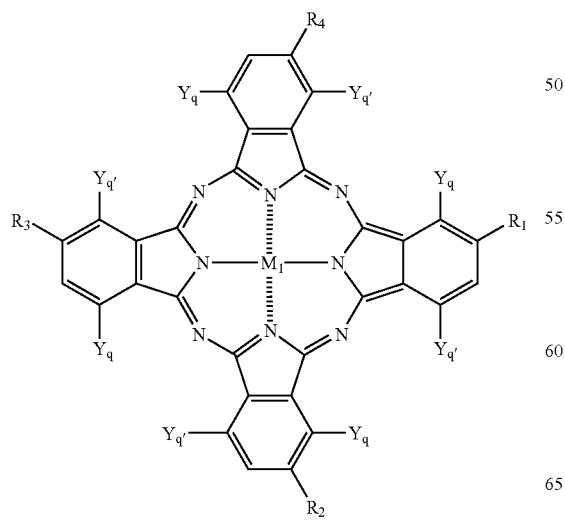

-continued

Formula (a)-3:

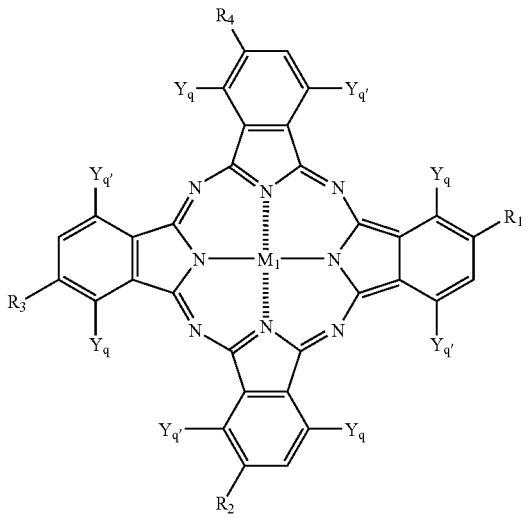

Formula (a)-4:

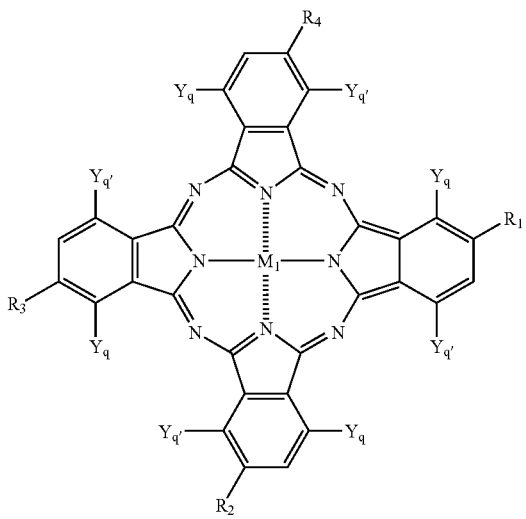

In the synthesis method above, when all $X_p$s are the same, a β-position substitution type phthalocyanine dye where $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (II), these dyes having electron-withdrawing substituents different from each other are preferred because the solubility and aggregating property of dye and the aging stability of ink can be controlled.

In the present invention, it has been found very important for the improvement of fastness that in any substitution type, the oxidation potential is more positive than 1.0 V (vs SCE). The great effect thereof cannot be expected at all from the above-described known techniques. Furthermore, although the reason is not particularly known, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, however, the phthalocyanine dye for use in the present invention is not limited to the following examples.

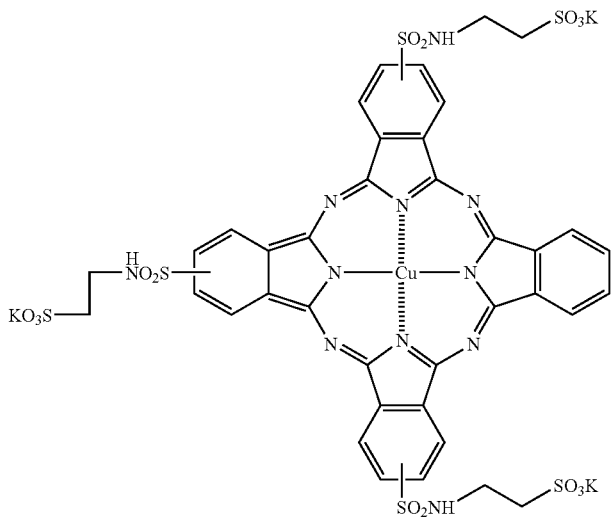

(I-1)

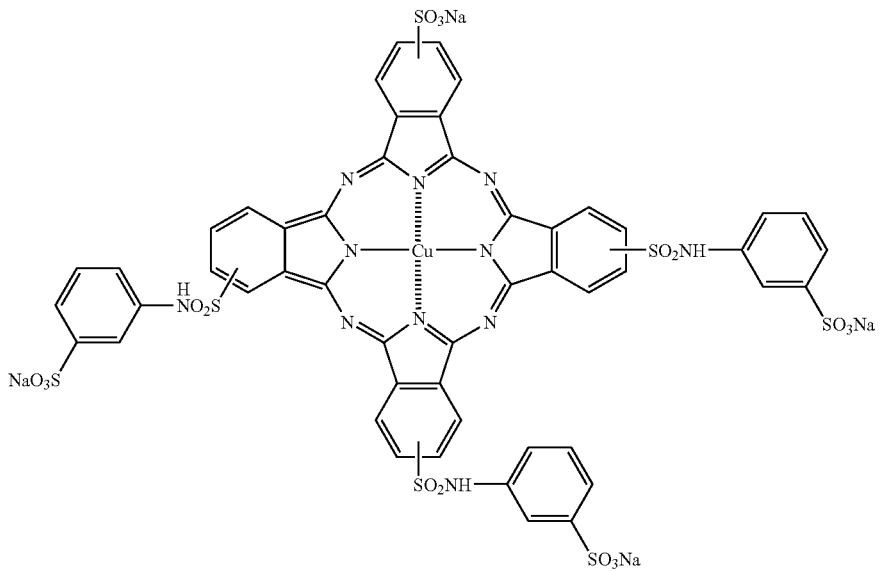

(I-2)

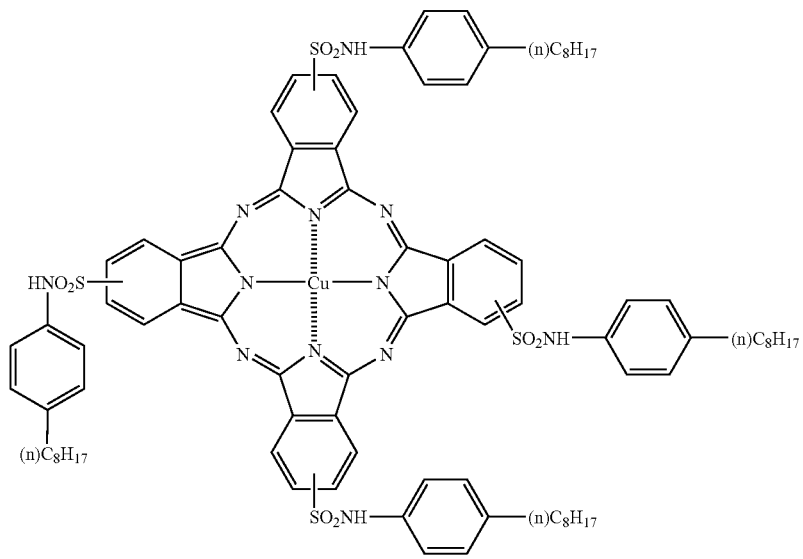
(I-3)
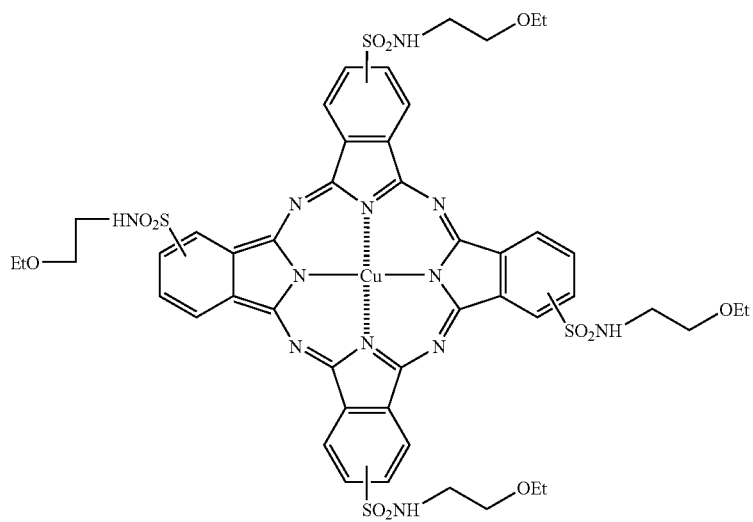
(I-4)

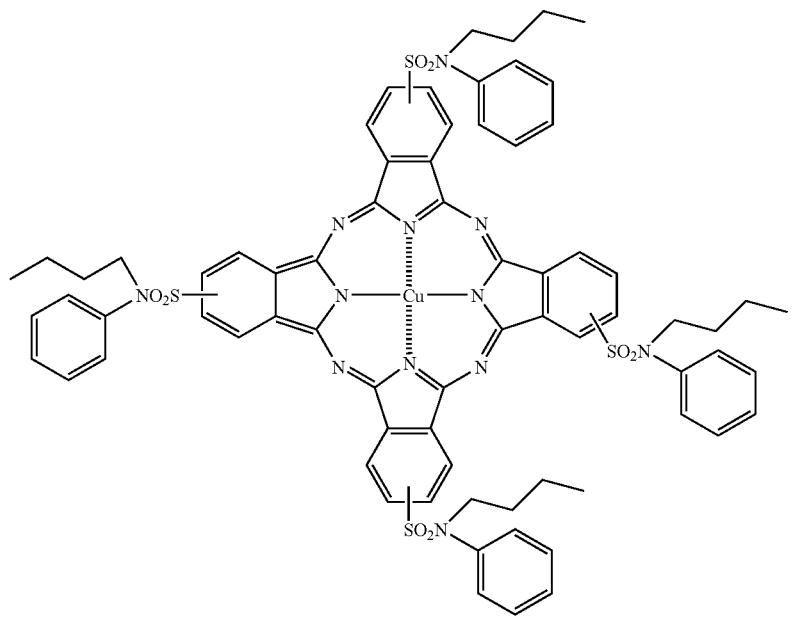
(I-5)
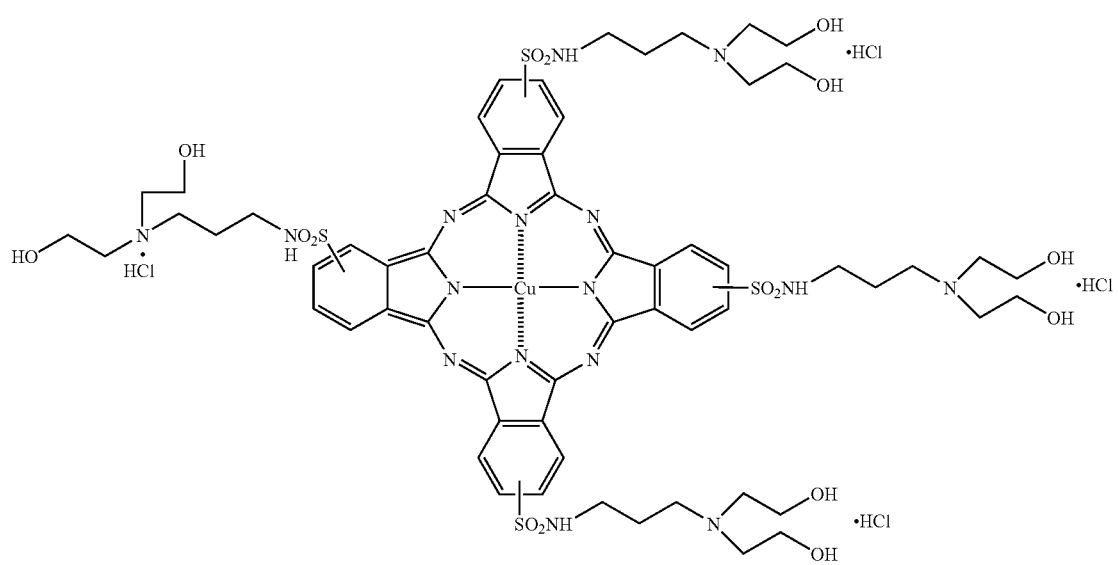
(I-6)

-continued
(I-7)
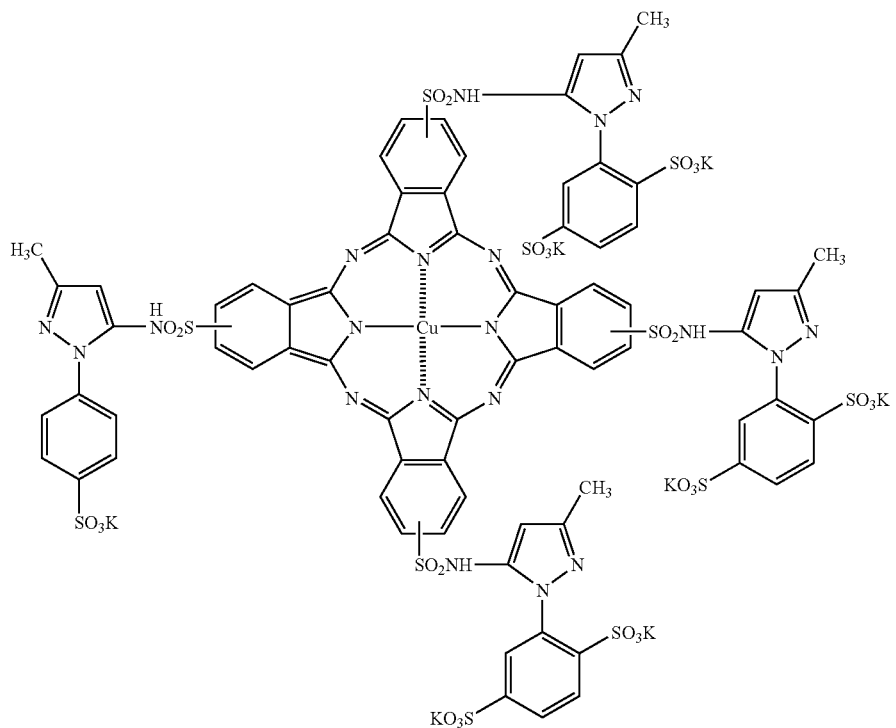
(I-8)
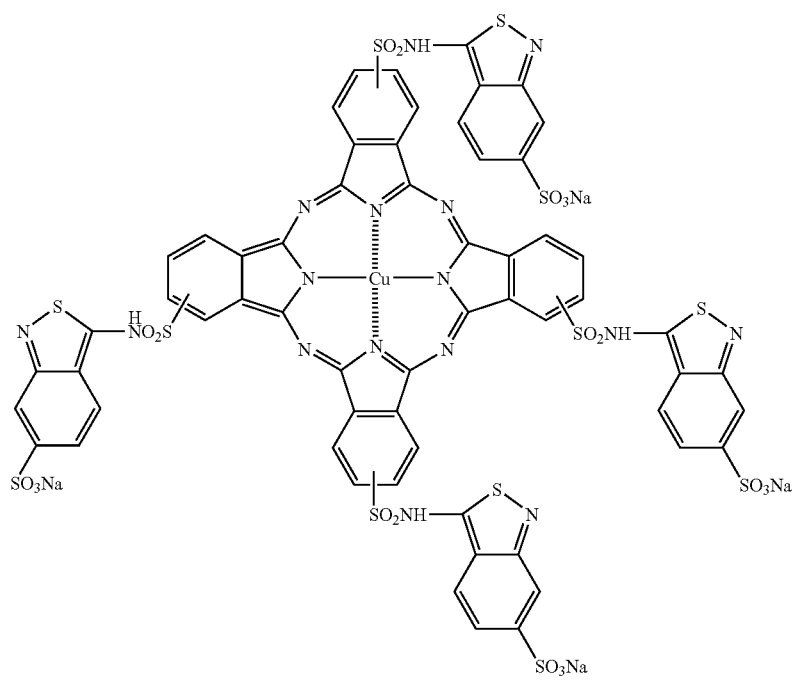

-continued
(I-9)
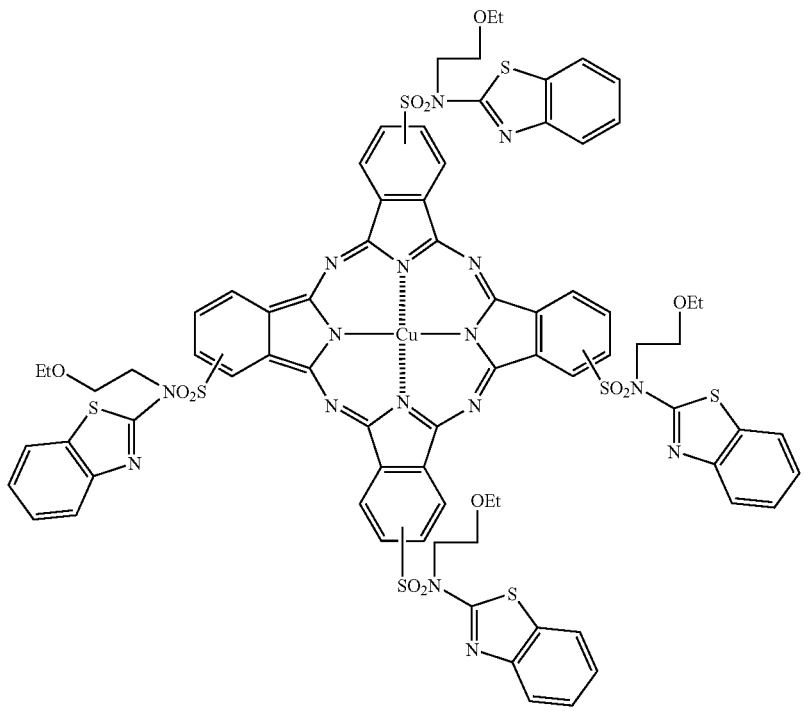
(I-10)
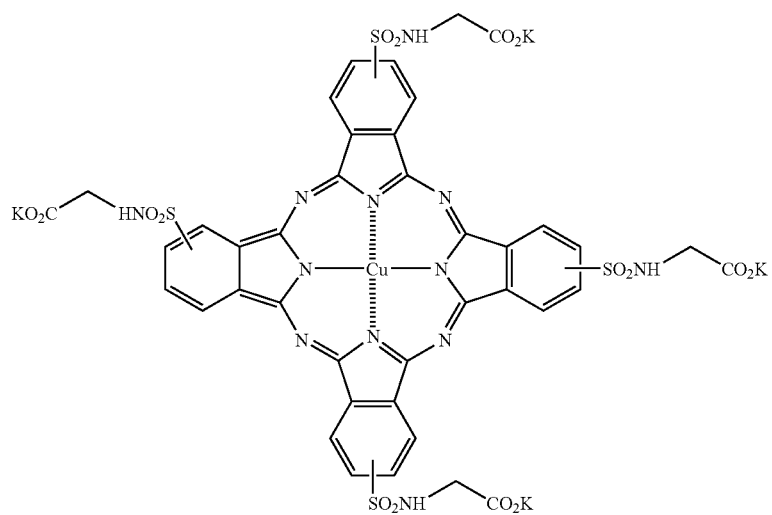

(I-11)
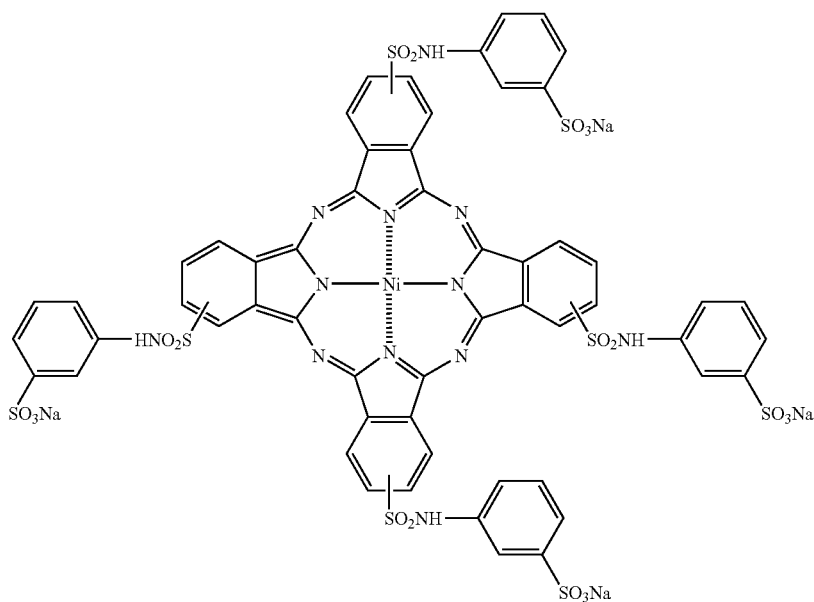
(I-12)
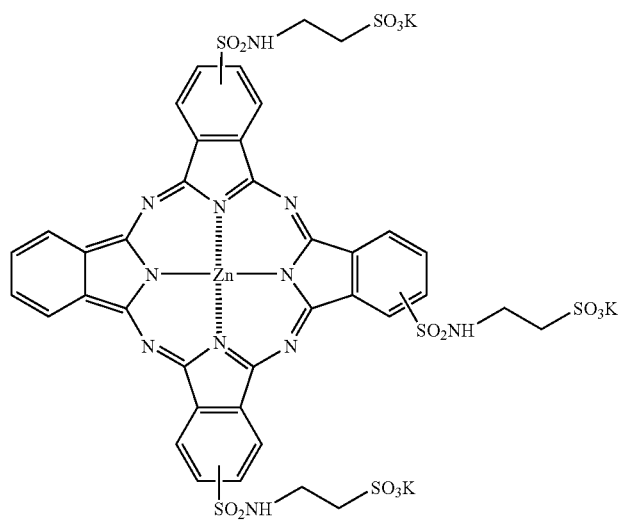

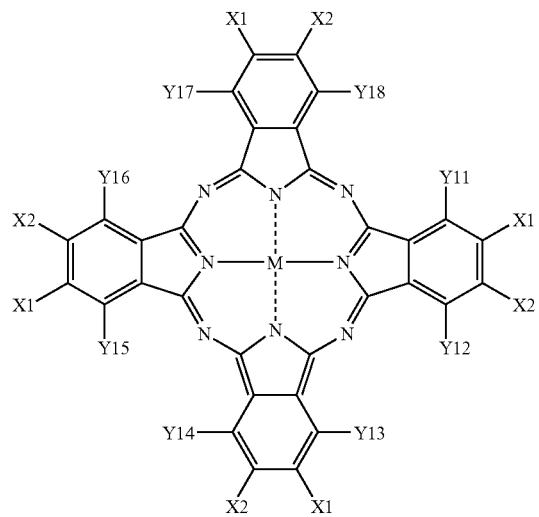

In Tables, specific examples of each pair of (X1, X2), (Y11, Y12), (Y13, Y14), (Y15, Y16) and (Y17, Y18) are independently in an irregular order.

| | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |

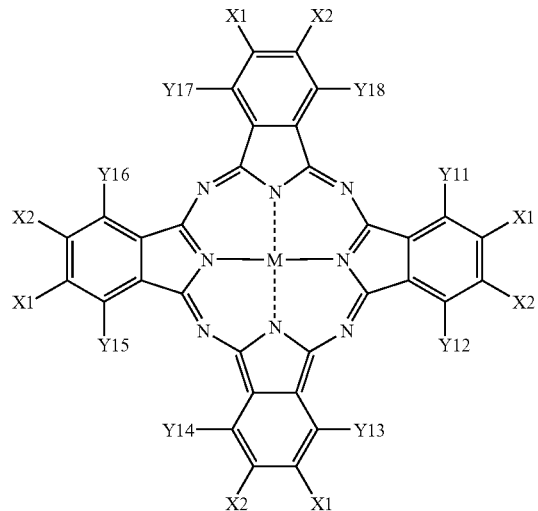

In Tables, specific examples of each pair of (X1, X2), (Y11, Y12), (Y13, Y14), (Y15, Y16) and (Y17, Y18) are independently in an irregular order

| | M | X1 | X2 | Y11, Y12 | Y13, Y14 | Y15, Y16 | Y17, Y18 |
|---|---|---|---|---|---|---|---|
| 111 | Cu | —$SO_2$—NH—$CH_2$—$CH_2$—$CH_2$—$SO_2$—NH—$CH_2$CH(OH)—$CH_2$—$SO_3Li$ | —H | —H, —H | —H, —H | —H, —H | —H, —H |
| 112 | Cu | —$SO_2$—NH—$CH_2$—$CH_2$—$CH_2$—$SO_2NH$—$CH_2$—CH(OH)—$CH_3$ | —$SO_3Li$ | —H, —H | —H, —H | —H, —H | —H, —H |
| 113 | Cu | —$SO_2$—$CH_2$—CH(OH)—$CH_2SO_3K$ | —H | —H, —H | —H, —H | —H, —H | —H, —H |
| 114 | Cu | —$SO_2$—$CH_2$—CH(OH)—$CH_3$ | —$SO_3Li$ | —H, —H | —H, —H | —H, —H | —H, —H |
| 115 | Cu | —$SO_2NH(CH_2)_3{}^{\oplus}N(CH_3)(CH_2CH_2OH)_2$·$CH_3$—C$_6$H$_4$—$SO_3{}^{\ominus}$ | —H | —H, —H | —H, —H | —H, —H | —H, —H |
| 116 | Cu | —CO—NH—$CH_2$—CH(OH)—$CH_2SO_3K$ | —H | —H, —H | —H, —H | —H, —H | —H, —H |
| 117 | Cu | —CO—NH—CH(COOLi)—$CH_2CH_2SO_3Li$ | —H | —H, —H | —H, —H | —H, —H | —H, —H |

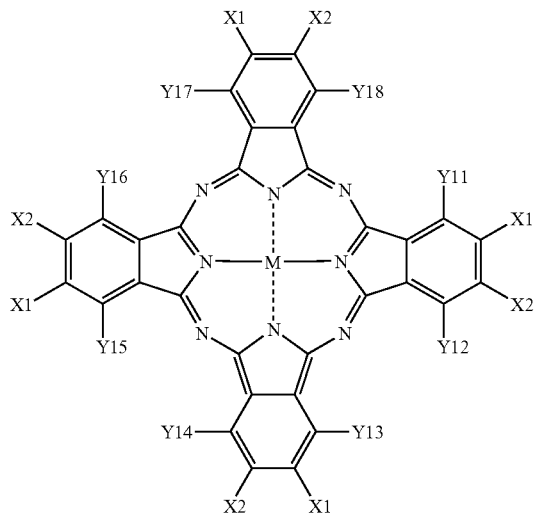

In Tables, specific examples of each pair of (X1, X2), (Y11, Y12), (Y13, Y14), (Y15, Y16) and (Y17, Y18) are independently in an irregular order.

| | M | X1 | X2 | Y11, Y12 | Y13, Y14 | Y15, Y16 | Y17, Y18 |
|---|---|---|---|---|---|---|---|
| 118 | Cu | —SO$_2$CH$_2$CH$_2$CH(CH$_3$)(SO$_3$Li) | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_3$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |
| 124 | Cu | —SO$_2$—NH—CH$_2$—CH(CH$_2$CH$_3$)—CH$_2$CHCH$_2$—CH$_3$ | —H | —H, —H | —H, —H | —H, —H | —H, —H |

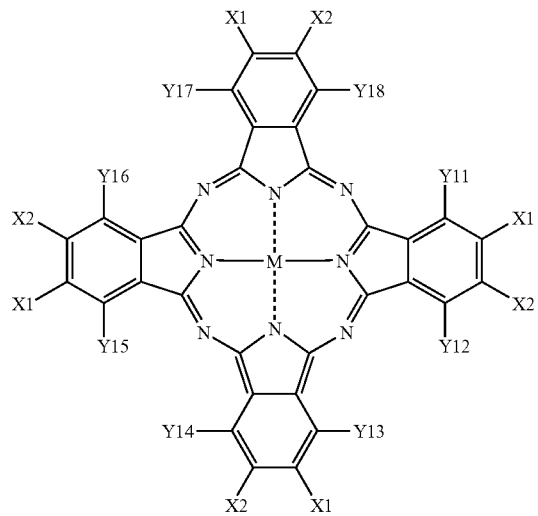

In Tables, specific examples of each pair of (X1, X2), (Y11, Y12), (Y13, Y14), (Y15, Y16) and (Y17, Y18) are independently in an irregular order.

| | M | X1 | X2 | Y11, Y12 | Y13, Y14 | Y15, Y16 | Y17, Y18 |
|---|---|---|---|---|---|---|---|
| 125 | Cu | —SO$_2$CH$_2$CH$_2$CH$_2$SO$_2$—NH—CH$_2$—CH(CH$_3$)—CH$_2$—CH$_3$ | —H | —H, —H | —H, —H | —H, —H | —H, —H |
| 126 | Cu | —SO$_2$—CH$_2$—CH$_2$—CH$_2$—CO$_2$—CH(CH$_3$)—CH$_2$—O—CH$_3$ | —H | —H, —H | —H, —H | —H, —H | —H, —H |
| 127 | Cu | —SO$_2$CH$_2$CH$_2$CH$_2$SO$_2$NHCH$_2$CH$_2$CH$_2$O—CH(CH$_3$)$_2$ | —H | —H, —H | —H, —H | —H, —H | —H, —H |
| 128 | Zn | —SO$_2$—CH$_2$—CH(O—CH$_3$)—CH$_2$—O—CH$_2$ | —CN | —H, —H | —H, —H | —H, —H | —H, —H |
| 129 | Cu | —CO—NH—CH$_2$—CH(CH$_2$CH$_3$)—CH$_2$—CH$_2$—CH$_2$CH$_3$ | —H | —Cl, —H | —Cl, —H | —Cl, —H | —Cl, —H |
| 130 | Cu | —CO$_2$—CH(CH$_3$)—CH$_2$—O—C$_4$H$_9$(t) | —H | —H, —H | —H, —H | —H, —H | —H, —H |
| 131 | Cu | —SO$_2$—CH$_2$—CH$_2$—CH(CH$_3$)—SO$_2$—NH—(2,5-(SO$_3$Li)$_2$-C$_6$H$_3$) | —H | —H, —H | —H, —H | —H, —H | —H, —H |

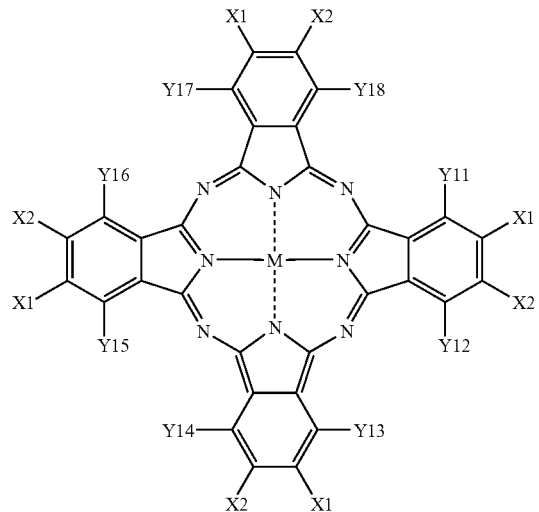

In Tables, specific examples of each pair of (X1, X2), (Y11, Y12), (Y13, Y14), (Y15, Y16) and (Y17, Y18) are independently in an irregular order.

| | M | X1 | X2 | Y11, Y12 | Y13, Y14 | Y15, Y16 | Y17, Y18 |
|---|---|---|---|---|---|---|---|
| 132 | Cu | —SO$_2$NH—C$_6$H$_3$(CO$_2$C$_6$H$_{13}$(n))$_2$ | —H | —H, —H | —H, —H | —H, —H | —H, —H |
| 133 | Cu | —SO$_2$NH—C$_6$H$_3$(OCH$_2$CH$_2$OCH$_3$)(SO$_2$NHCH$_2$CH(C$_2$H$_5$)C$_4$H$_9$) | —H | —H, —H | —H, —H | —H, —H | —H, —H |
| 134 | Cu | —SO$_2$NH—C$_6$H$_4$—SO$_2$—NH—CH$_2$—CH(CH$_2$CH$_3$)—CH$_2$CH$_2$—CH$_2$—CH$_3$ | —H | —H, —H | —H, —H | —H, —H | —H, —H |
| 135 | Cu | —SO$_2$—C$_6$H$_3$(CO$_2$Na) | —H | —H, —H | —H, —H | —H, —H | —H, —H |
| 136 | Cu | —SO$_2$N(C$_4$H$_9$(n))(C$_6$H$_5$) | —H | —H, —H | —H, —H | —H, —H | —H, —H |

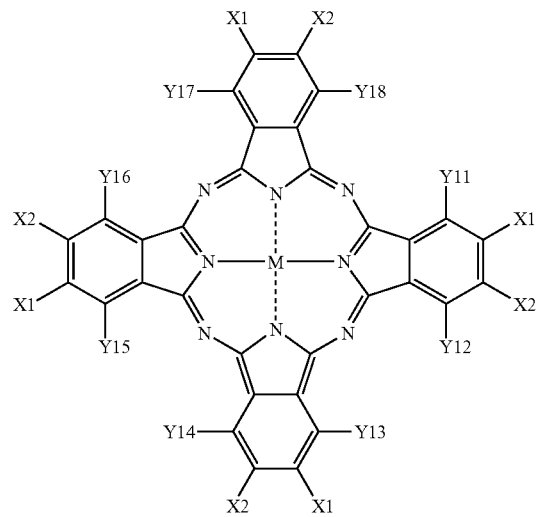
In Tables, specific examples of each pair of (X1, X2), (Y11, Y12), (Y13, Y14), (Y15, Y16) and (Y17, Y18) are independently in an irregular order.
| | M | X1 | X2 | Y11, Y12 | Y13, Y14 | Y15, Y16 | Y17, Y18 |
|---|---|---|---|---|---|---|---|
| 137 | Cu | —SO$_2$—(benzothiazole)—SO$_3$Li | —H | —H, —H | —H, —H | —H, —H | —H, —H |
| 138 | Cu | —SO$_2$NH—(3-methylpyrazole)-N-(2,5-disulfolithium phenyl) | —H | —H, —H | —H, —H | —H, —H | —H, —H |
| 139 | Cu | —SO$_2$(CH$_2$)$_3$—NH—C(O)—(phenyl with CO$_2$Li, CO$_2$Li) | —Cl | —H, —H | —H, —H | —H, —H | —H, —H |
| 140 | Cu | —CO$_2$—CH$_2$CH$_2$CH$_2$—NH—(triazine with NH—CH$_2$—CH$_2$—CH(CH$_3$)—SO$_3$Li groups ×2) | —H | —H, —H | —H, —H | —H, —H | —H, —H |

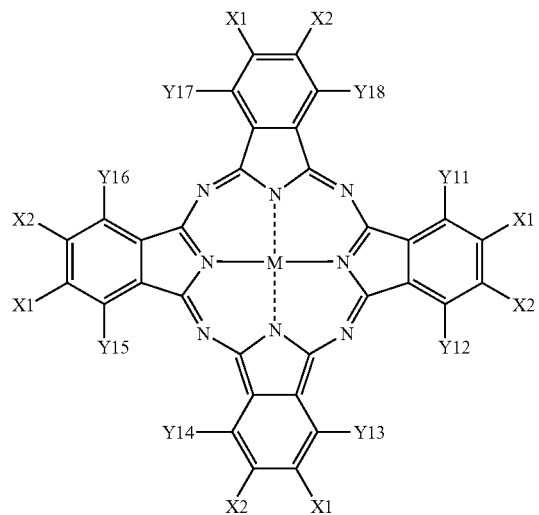

In Tables, specific examples of each pair of (X1, X2), (Y11, Y12), (Y13, Y14), (Y15, Y16) and (Y17, Y18) are independently in an irregular order.

| | M | X1 | X2 | Y11, Y12, Y13, Y14 | Y15, Y16 | Y17, Y18 |
|---|---|---|---|---|---|---|
| 141 | Cu | —SO$_2$NH—CH(COONa)—CH$_2$—CO—N—(CH$_2$CH$_2$OH)$_2$ | —H | —H, —H, —H, —H | —H, —H | —H, —H |
| 142 | Cu | —SO$_2$NH—C$_6$H$_4$—NHC(O)—C$_6$H$_4$—SO$_3$Li | —H | —H, —H, —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H, —H, —H | —H, —H | —H, —H |
| 144 | Cu | —SO$_2$—CH$_2$CH$_2$CH$_2$—NH—CO—C$_6$H$_4$—CO—NH—CH(COOLi)—CH$_2$—COOLi | —H | —H, —H, —H, —H | —H, —H | —H, —H |
| 145 | Cu | —SO$_2$CH$_2$CH$_2$OCH$_2$CH$_2$OCH$_2$CH$_2$SO$_3$Li | —H | —H, —H, —H, —H | —H, —H | —H, —H |

M-Pc(Xp$_1$)$_m$(Xp$_2$)$_n$ In Tables, each introduction site of substituents (X$_{p1}$) and (X$_{p2}$) is in an irregular order within the β-position substitution type.

| | M | Xp$_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |
| 148 | Cu | —SO$_2$—NH—CH$_2$—CH(CH$_3$)—SO$_3$Li | 3 |
| 149 | Cu | —SO$_2$—NH—CH$_2$—CH(CH$_3$)—SO$_3$Li | 2 |

-continued

M-Pc(Xp$_1$)$_m$(Xp$_2$)$_n$ In Tables, each introduction site of substituents (X$_{p1}$) and (X$_{p2}$) is in an irregular order within the β-position substitution type.

| | | | |
|---|---|---|---|
| 150 | Cu | —SO$_2$—NH—CH$_2$—CH$_2$—SO$_2$—NH—CH$_2$CH$_2$—COONa | 3 |
| 151 | Cu | —SO$_2$—NH—C$_6$H$_4$—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Li | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |

| | Xp$_2$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N-(CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N-(CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |

M-Pc(Xp₁)ₘ(Xp₂)ₙ In Tables, each introduction site of substituents (X_{p1}) and (X_{p2}) is in an irregular order within the β-position substitution type.

| | M | Xp₁ | m |
|---|---|---|---|
| 158 | Cu | —SO₂—CH₂—CH(OH)—CH₂SO₃Li | 3 |
| 159 | Cu | —SO₂NHCH₂CH₂—SO₃Li | 3 |
| 160 | Cu | —SO₂—CH₂—CH₂—O—CH₂—CH₂—O—CH₂—CH₂—SO₃Na | 3 |
| 161 | Cu | —SO₂CH₂CH₂CH₂SO₃Li | 3 |
| 162 | Cu | —SO₂CH₂CH₂CH₂SO₃Li | 2 |
| 163 | Cu | —SO₂CH₂CH₂CH₂SO₃K | 3 |
| 164 | Cu | —SO₂CH₂CH₂CH₂SO₃Li | 2 |
| 165 | Cu | —CO—NH—CH₂—CH₂—SO₃K | 3 |
| 166 | Cu | —CO—NH—CH₂—CH₂—SO₂—NH—CH₂—CH₂—COONa | 3 |
| 167 | Cu | —SO₂(CH₂)₃SO₂NHCH₂—CH(OH)—CH₂CO₂Li | 2.5 |
| 168 | Cu | —CO₂—CH₂—CH₂—CH(CH₃)—SO₃Na | 2 |
| 169 | Cu | —CO₂—CH₂—CH₂—CH₂—SO₃Li | 3 |
| 170 | Cu | —CO₂—CH₂—CH₂—CH₂COOK | 2 |

| | Xp₁ | n |
|---|---|---|
| 158 | —SO₂—CH₂—C₆H₄—SO₂NH—CH₂—CH(OH)—CH₂—OH | 1 |
| 159 | —SO₂—CH₂—CH₂—CH₂—SO₂—NH—CH₂—CH(OH)—CH₃ | 1 |
| 160 | —SO₂—CH₂—CH₂—CH₂—CO—N(CH₂—CH₂—COONa)(CH₂—COONa) | 1 |
| 161 | —SO₂CH₂CH₂CH₂SO₂NHCH₂—CH(OH)—CH₂SO₃Li | 1 |
| 162 | —SO₂CH₂CH₂OCH₂CH₂OCH₂CH₂OH | 2 |
| 163 | —SO₂CH₂CH₂CH₂SO₂NH—CH(CH₃)—CH₂—OH | 1 |
| 164 | —SO₂CH₂CH₂CH₂SO₂N(CH₂CH₂OH)₂ | 2 |
| 165 | —CO—NH—CH₂—CH₂—O—CH₂—CH₂—OH | 1 |
| 166 | —CO—NH—CH₂—CH(OH)—CH₃ | 1 |
| 167 | —CO—NH—CH₂—CH₂—CH₂—CO—N(CH₂—CH₂—OH)₂ | 1.5 |
| 168 | —CO—CH₂—CH₂—CH₂—CO—N(CH₂—CH₂—OH)₂ | 2 |

-continued

M-Pc(Xp₁)ₘ(Xp₂)ₙ In Tables, each introduction site of substituents (X$_{p1}$) and (X$_{p2}$) is in an irregular order within the β-position substitution type.

| 169 | —CO₂—CH₂—CH₂—CH₂—SO₂—NH—CH₂—CH(OH)—CH₃ | 1 |
| 170 | —CO₂—CH₂—CH₂—CH₂—SO₂—NH—CH₂—CH(OH)—CH₃—COOK | 2 |

M-Pc(Xp₁)ₘ(Xp₂)ₙ In Tables, each introduction site of substituents (X$_{p1}$) and (X$_{p2}$) is in an irregular order within the β-position substitution type.

| | M | Xp₁ | m |
|---|---|---|---|
| 171 | Cu | —CO₂—CH₂—CH₂—O—CH₂—CH₂—O—CH₂—CH₂—SO₃Na | 3 |
| 172 | Cu | —SO₂CH₂CH₂OCH₂CH₂O—CH₂CH₂SO₃K | 2 |
| 173 | Cu | —SO₂(CH₂)₃SO₂NHCH₂CHCH₂OH with OH | 2 |
| 174 | Cu | —SO₂(CH₂)₃SO₂NHCH₂—CH(OH)—CH₂SO₃K | 3 |
| 175 | Cu | —SO₂(CH₂)₃SO₂NH(CH₂)₃N(CH₂CH₂OH)₂ | 2 |
| 176 | Cu | —SO₂—CH₂—CH₂—CH₂—SO₂—NH—CH₂—CH(OH)—CH₃ | 3 |
| 177 | Cu | —SO₂—CH₂—CH₂—O—CH₂—CH₂—O—CH₃ | 2 |
| 178 | Cu | —SO₂—CH₂—CH₂—O—CH₂—CH₂—O—CH₂—CH₂—OH | 3 |
| 179 | Cu | —SO₂—CH₂—CH(CH₂CH₃)—CH₂CH₂—CH₂CH₃ | 2 |
| 180 | Cu | —SO₂—CH₂—CH₂—CH₂—SO₂—NH—CH₂—CH(O—CH₃)—CH₃ | 3 |
| 181 | Cu | —SO₂—CH₂—CH₂—CH₂—CO₂—NH—CH(CH₃)—CH₂—CH₃ | 3 |
| 182 | Cu | —SO₂—CH₂—CH₂—CH₂—SO₂NH—CH₂—CH(OH)—CH₃ | 2.5 |

| | Xp₂ | n |
|---|---|---|
| 171 | —SO₂—CH₂—C₆H₄—SO₂NH—CH₂—CH(OH)—CH₂—OH | 1 |
| 172 | —CO₂—CH₂—CH₂—CH₂—CO₂—CH₂—CH₂—CH(OH)—CH₂—COOK | 2 |
| 173 | —CO₂—CH₂—CH(OH)—CH₂—SO₃Li | 2 |

-continued

M-Pc(Xp$_1$)$_m$(Xp$_2$)$_n$ In Tables, each introduction site of substituents (X$_{p1}$) and (X$_{p2}$) is in an irregular order within the β-position substitution type.

| No. | Structure | n |
|---|---|---|
| 174 | —CO$_2$—CH$_2$—CH$_2$—CH$_2$—SO$_2$—NH—CH$_2$—CH(OH)—CH$_3$ | 1 |
| 175 | —CO$_2$—CH$_2$—CH$_2$—CH$_2$—CO—N(CH$_2$—CH$_2$—COOLi)—CH$_2$—COOLi | 2 |
| 176 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | —SO$_2$—CH$_2$—CH$_2$—CH$_2$—SO$_2$—NH—CH$_2$—CH(OH)—CH$_3$ | 1 |
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| 179 | —SO$_2$—CH$_2$—CH$_2$—CH$_2$—SO$_2$—NH—CH$_2$—CH(O—CH$_3$)—CH$_3$ | 2 |
| 180 | —SO$_2$NH—CH$_2$—CH$_2$—SO$_2$NH—CH$_2$—CH$_2$—O—CH$_2$—CH$_2$—OH | 1 |
| 181 | —SO$_2$—CH$_2$—CH$_2$—CH$_2$—SO$_2$—NH—CH—(CH$_3$)$_2$ | 1 |
| 182 | —SO$_2$—CH$_2$—CH$_2$—CH$_2$—CO$_2$—NH—CH(CH$_3$)—CH$_2$—CH$_3$ | 1.5 |

M-Pc(Xp$_1$)$_m$(Xp$_2$)$_n$ In Tables, each introduction site of substituents (X$_{p1}$) and (X$_{p2}$) is in an irregular order within the β-position substitution type.

| No. | M | Xp$_1$ | m |
|---|---|---|---|
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(OH)—CH$_3$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH—(CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH—(CH$_3$)$_2$ | 3 |
| 190 | Cu | —CO—NH—CH$_2$—CH(CH$_2$CH$_3$)—CH$_2$—CH$_2$—CH$_2$CH$_3$ | 3 |

-continued

M-Pc(Xp1)m(Xp2)n In Tables, each introduction site of substituents (Xp1) and (Xp2) is in an irregular order within the β-position substitution type.

| | Xp2 | n |
|---|---|---|
| 183 | $-SO_2-CH_2-CH_2-CH_2-SO_2-NH-(CH_2)_3-CH_2-O-CH_2CH_2-OH$ | 2 |
| 184 | $-SO_2-CH_2-CH_2-O-CH_2-CH_2-O-CH_3$ | 1 |
| 185 | $-SO_2-CH_2-CH_2-O-CH_2-CH_2-O-CH_2-CH_2-O-CH_3$ | 1 |
| 186 | $-SO_2-CH_2-CH_2-O-CH_2-CH_2-O-CH_2-CH_2-OH$ | 1 |
| 187 | $-CO_2-CH_2-\underset{\underset{CH_2CH_3}{\mid}}{CH}-CH_2-CH_2-CH_2CH_3$ | 1 |
| 188 | $-CO_2-CH_2-CH_2-O-CH_2-CH_2-O-CH_3$ | 1 |
| 189 | $-SO_2-NH-CH_2-\underset{\underset{CH_2CH_3}{\mid}}{CH}-CH_2-CH_2-CH_2-CH_3$ | 1 |
| 190 | $-CO-NH-CH_2-CH_2-O-CH_2-CH_2-O-CH_3$ | 1 |

The structure of the phthalocyanine compound represented by M-Pc(X$_{p1}$)$_m$(X$_{p2}$)$_n$ in Compound Nos. 146 to 190 is shown below:

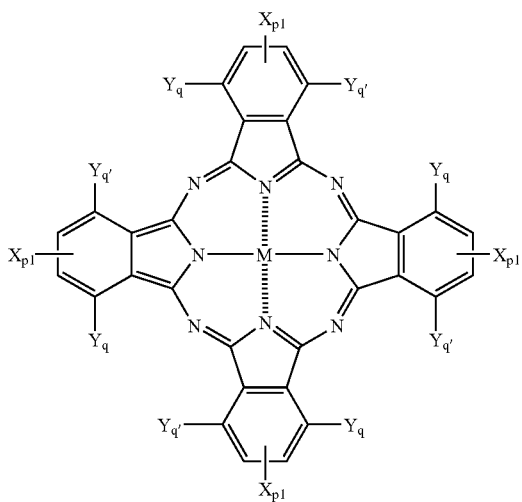

(wherein each X$_{p1}$ is independently X$_{p1}$ or X$_{p2}$).

The phthalocyanine dye represented by formula (I) can be synthesized according to the patent publications described above. Furthermore, the phthalocyanine dye represented by formula (II) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in these patent publications.

The inkjet recording ink of the present invention contains the phthalocyanine dye in an amount of preferably from 0.2 to 20 mass %, more preferably from 0.5 to 15 mass %.

The inkjet recording ink of the present invention can be prepared by dissolving and/or dispersing the phthalocyanine dye in an aqueous medium. The term "aqueous medium" as used in the present invention means water or a mixture of water and a slight amount of water-miscible organic solvent, where additives such as wetting agent (preferably a surfactant as a dissolution or dispersion aid), stabilizer and antiseptic are added, if desired.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

The content of the water-miscible organic solvent for use in the present invention is usually from 1 to 80 mass %, preferably from 5 to 60 mass %, more preferably from 10 to 50 mass %, in the ink.

Out of those water-miscible organic solvents, if only an organic solvent having a high boiling point is used, this causes a problem that the formed image is readily blurred under high-humidity condition.

This problem can be solved by using, as the water-miscible organic solvent, at least one organic solvent having a boiling point of 150° C. or more and at least one organic solvent having a boiling point of less than 150° C.

Out of those solvents, examples of the low-boiling point solvent having a boiling point of less than 150° C. include methanol, ethanol, n-propanol, i-propanol, n-butanol, 2-butanol, tert-butanol, 2-methoxyethanol, 1-methoxy-2-propanol, 2-methoxy-1-propanol, acetone and acetonitrile. Among these, alcohol-base solvents are preferred.

The organic solvent having a boiling point of 150° C. or more can be selected from those described above, but this organic solvent is also preferably an alcohol-based solvent.

Also, two or more low-boiling solvents and two or more high-boiling point solvents may be selected and used. The percentage of the low-boiling point solvent in the entire organic solvent is preferably from 1 to 80 mass %, more preferably from 5 to 50 mass %.

It is also preferred to contain, as the water-miscible organic solvent, a mixture of two or more members where at least one member contains a polyhydric alcohol and/or a derivative thereof, at a concentration of 10 to 60 (mass/volume) %.

Examples of the polyhydric alcohol include those described above and examples of the polyhydric alcohol derivative include glycol derivatives. Examples of the glycol derivative include those described above.

In this case, the water-miscible organic solvent may be constituted by only two or more polyhydric alcohols, by only two or more polyhydric alcohol derivatives or by one or more polyhydric alcohol and one or more polyhydric alcohol derivative.

The proportion of the polyhydric alcohol and/or a derivative thereof contained in the water-miscible organic solvent is preferably from 15 to 55 mass %, more preferably from 20 to 50 mass %.

Out of those water-miscible organic solvents, if a solvent in which the dye has a high solubility is used in a large amount, this also causes a problem that the formed image is readily blurred under high-humidity condition.

This problem can be solved when an organic solvent in which the dye has a solubility of 10 (g/100 g-solvent) or more at 25° C. is contained as the water-miscible organic solvent to a content of 10 mass % or less in the ink.

The "solubility" as used herein indicates the mass of a solute dissolvable in 100 g of a solvent at a constant temperature and the unit thereof is "g/100 g-solvent".

As for the organic solvent in which the dye has a solubility of 10 (g/100 g-solvent) or more at 25° C., among those water-miscible organic solvents, alcohol-base solvents are particularly preferred.

The content of the solvent in which the dye has a solubility of 10 g/100 g-solvent or more at 25° C. is 10 mass % or less, preferably 5 mass % or less, in the ink.

Out of those water-miscible organic solvents, if an organic solvent having a heteroatom other than oxygen is used, this also causes a problem that the formed image is readily blurred under high-humidity condition.

Therefore, an organic solvent not containing a heteroatom other than an oxygen atom is preferably used as the water-miscible organic solvent.

Examples of the organic solvent having a heteroatom other than an oxygen atom include, out of those water-miscible organic solvents, thiodiglycol, amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile).

Accordingly, the organic solvent not containing a heteroatom other than an oxygen atom includes, out of those water-miscible organic solvents, the organic solvents excluding the above-described organic solvents having a heteroatom other than an oxygen atom.

The organic solvent as used herein indicates an organic solvent which is used as the main solvent for the preparation of ink, and does not include a pH adjusting agent used for adjusting the pH of ink, such as organic acids and amines, and a surfactant used for controlling the surface tension. Preferred examples of the organic solvent used here include alcohols, polyhydric alcohols (e.g., diol, triol) and glycol derivatives.

Out of those water-miscible organic solvents, if an organic solvent having a high vapor pressure is used, this causes a problem that the ejection stability is impaired due to drying of ink at the inkjet head.

Therefore, a water-miscible organic solvent having a vapor pressure of 2,000 Pa or less at 20° C. and exerting a drying inhibiting function or a penetration accelerating function is preferably contained.

The drying inhibiting function is a function of preventing clogging due to drying of ink at the ejection port and specific examples of the water-miscible organic solvent having such a function include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, preferred are polyhydric alcohols such as glycerin and diethylene glycol.

The penetration accelerating function is a function of more successfully penetrating the ink into paper and examples of the water-miscible organic solvent having such a function include lower monoalkyl ethers of polyhydric alcohol (for example, monomethyl ether, monoethyl ether, mono-n-butyl ether, mono-iso-butyl ether and mono-n-hexyl ether of ethylene glycol, diethylene glycol, triethylene glycol, propylene glycol or dipropylene glycol) and lower dialkyl ethers of polyhydric alcohol (for example, dimethyl ether and diethyl ether of ethylene glycol, diethylene glycol, triethylene glycol or propylene glycol).

The water-miscible organic solvent used here may have two or more of these functions and other functions such as viscosity adjusting function, in combination.

Incidentally, a water-miscible organic solvent having a vapor pressure exceeding 2,000 Pa at 20° C. can be used in an amount of 20 mass % or less in the ink. Examples of the water-miscible organic solvent other than the water-miscible organic solvent having a vapor pressure exceeding 2,000 Pa at 20° C., which can be used in combination, include ethanol.

In the case where the phthalocyanine dye is an oil-soluble dye, the inkjet recording ink can be prepared by dissolving the oil-soluble dye in a high boiling point organic solvent and emulsion-dispersing it in an aqueous medium.

The high boiling point organic solvent for use in the present invention preferably has a boiling point of 150° C. or more, more preferably 170° C. or more.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tertoctylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid and diphenylphosphoric acid).

The high boiling point organic solvent can be used in an amount of, in terms of the mass ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and the synthesis method of these high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225, 240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

In the present invention, the oil-soluble dye or high boiling point organic solvent is used by emulsion-dispersing it in an aqueous medium. Depending on the case, a low boiling point organic solvent may be used in combination at the emulsion-dispersion in view of emulsifiability. The low boiling point organic solvent which can be used in combination is an organic solvent having a boiling point of about 30 to 150° C. at atmospheric pressure. Preferred examples thereof include, but are not limited to, esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane).

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used.

In performing the emulsion-dispersion of the present invention, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surfactant used for emulsification is differing in the purpose from the surfactant added for adjusting the liquid properties of the inkjet recording ink, which is described later, but the same surfactant can be used and if the case is so, the function of adjusting the properties of ink can be exerted as a result.

For the purpose of stabilizing the dispersion immediately after emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used.

Furthermore, for the stabilization of dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains $—SO^{2-}$ or $—COO^-$.

In the case of using this polymer which does not substantially dissolve in an aqueous medium, the polymer is preferably used in an amount of 20 mass % or less, more preferably 10 mass % or less, based on the high boiling point organic solvent.

In preparing an aqueous ink by dispersing the oil-soluble dye or high boiling point organic solvent according to emulsion-dispersion, a matter of importance is the control of particle size. In order to elevate the color purity or density of an image formed by the inkjet recording, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417-418.

For example, the ink is diluted with distilled water to have a particle concentration of 0.1 to 1 mass %, then, the particle size can be easily measured by a commercially available volume average particle size measuring apparatus (for example, Microtrac UPA (manufactured by Nikkiso K.K.)). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about ejection failure or ejection slippage of ink and this seriously affects the printing performance. In order to prevent these troubles, it is important to reduce the number of particles having a particle size of 5 μm or more to 10 or less and the number of particles having a particle size of 1 μm or more to 1,000 or less, in 1 μl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, but a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A.P.V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during filling of the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent. Examples of the method include evaporation, vacuum evaporation and ultrafiltration. This removal of the low boiling point organic solvent is preferably performed as soon as possible immediately after the emulsification.

The inkjet recording ink of the present invention may contain a surfactant to control the liquid properties of the ink, whereby excellent effects can be provided, such as enhancement of ejection stability of ink, improvement of water resistance of image, and prevention of bleeding of printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is preferably from 0.001 to 15 mass %, more preferably from 0.005 to 10 mass %, still more preferably from 0.01 to 5 mass %, in the ink.

In the inkjet recording ink of the present invention, additives such as drying inhibitor for preventing clogging due to drying of ink at the ejection port, penetration accelerator for more successfully penetrating the ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, may be appropriately selected and used in an appropriate amount.

The drying inhibitor for use in the present invention is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in an amount of 10 to 50 mass % in the ink.

Examples of the penetration accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 mass % of the penetration accelerator in the ink. The penetration accelerator is preferably used in an amount of causing no blurring of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291, compounds described in *Research Disclosure* No. 24239, and compounds of absorbing ultraviolet light and emitting fluorescent light, so-called fluorescent brightening agents, as represented by stilbene-base compounds and benzoxazole-base compounds.

As for the antioxidant which is used in the present invention for improving the preservability of image, various organic or metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in an amount of 0.02 to 5.00 mass % in the ink.

The fungicide is described in detail, for example, in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. The rust inhibitor is preferably used in an amount of 0.02 to 5.00 mass % in the ink.

The pH adjusting agent for use in the present invention can be suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance tends to deteriorate. Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include a hydrochloric acid, a sulfuric acid and a phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surface tension of the ink of the present invention is, with or without use of such a surface tension adjusting agent, preferably from 20 to 60 mN/m, more preferably from 25 to 45 mN/m.

The ink of the present invention preferably has a viscosity of 30 mPa·s or less. The viscosity is more preferably adjusted to 20 mPa·s or less. For the purpose of adjusting the viscosity, a viscosity adjusting agent is sometimes used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)—*Zairyo no Kaihatsu Doko•Tenbo Chosa*— (*Chemicals for Inkjet Printer* (*Enlarged Edition of 98*)—*Survey on Development Tendency•Prospect of Materials*—), pp. 162-174, CMC (1997).

In the present invention, if desired, various cationic, anionic or nonionic surfactants described above may be used as a dispersant or a dispersion stabilizer, and fluorine- or silicone-base compounds or chelating agents as represented by EDTA may be used as a defoaming agent.

The recording paper and recording film for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used. The thickness of the support is preferably from 10 to 250 μm and the basis weight is preferably from 10 to 250 g/m$^2$.

An image-receiving layer and a backcoat layer may be provided on the support as it is to produce an image-receiving material, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process (gas phase process) or a silicic acid hydrate obtained by a wet production process.

Specific examples of the recording paper containing the pigment in the image-receiving layer, which can be used, include those disclosed in JP-A-10-81064, JP-A-10-119423, JP-A-10-157277, JP-A-10-217601, JP-A-10-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the image-receiving layer.

The image-receiving layer may contain a mordant, a water-proofing agent, a light fastness enhancer, a gas resistance enhancer, a surfactant, a hardening agent and other additives in addition to the pigment and aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride and cation polyacrylamide. The content of the cationic resin is preferably from 1 to 15 mass %, more preferably from 3 to 10 mass %, based on the entire solid content of the ink-receiving layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, a releasability improver, a slipperiness improver or an antistatic agent. The surfactant is described in JP-A-62-173463 and JP-A-62-183457.

Instead of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin) The organic fluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The image-receiving layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing the dimension and preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and is used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

The inkjet recording ink of the present invention can also be used for uses other than the inkjet recording, such as a material for display image, an image-forming material for interior decoration, and an image-forming material for outdoor decoration.

The material for display image indicates various materials such as poster, wallpaper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo.

In the case of using the dye of the present invention as a material for forming a display image, the image includes not only a strict image but also all patterns by a dye, which can be acknowledged by a human, such as abstract design, letter and geometrical pattern.

The material for interior decoration indicates various materials such as wallpaper, ornamental goods (e.g., ornament, doll), luminaire member, furniture member and design member of floor or ceiling. In the case of using the dye of the present invention as a material for forming an image, the image includes not only a strict image but also all patterns by a dye, which can be acknowledged by a human, such as abstract design, letter and geometrical pattern.

The material for outdoor decoration indicates various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

EXAMPLES

The present invention is described below by referring to Examples, however, the present invention is not limited thereto.

(Ink Containing at Least One Organic Solvent Having a Boiling Point of 150° C. or More and at Least One Organic Solvent Having a Boiling Point of Less than 150° C.)

Example 1

Deionized water was added to the following components to make 1 liter and the resulting solution was stirred for 1 hour under heating at 30 to 40° C. and then filtered under reduced pressure through a microfilter having an average pore size of 0.25 μm to prepare a light cyan ink solution (LC-101)

[Formulation of Light Cyan Ink LC-101]

| (Solid Contents) | |
|---|---|
| Cyan Dye (154) of the present invention | 17.5 g/liter |
| Benzotriazole (BTZ) | 0.08 g/liter |
| PROXEL XL2 | 3.5 g/liter |
| (Liquid Components) | |
| Diethylene glycol (DEG) | 150 g/liter |
| Glycerin (GR) | 130 g/liter |

-continued

| | |
|---|---|
| Triethylene glycol monobutyl ether (TGB) | 130 g/liter |
| Triethanolamine (TEA) | 6.9 g/liter |
| Surfynol STG (SW) | 10 g/liter |

Inks LC-102 to LC-106 were prepared by changing the solvent species of LC-101 as shown in Table 1 below.

TABLE 1

| | LC-101 | LC-102 | LC-103 | LC-104 | LC-105 | LC-106 |
|---|---|---|---|---|---|---|
| (154) | 17.5 g | 17.5 g | 17.5 g | 17.5 g | 17.5 g | 17.5 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | — | 150 g | 50 g | 50 g | 50 g |
| GR | 130 g | 150 g | 100 g | 100 g | 100 g | 100 g |
| TGB | 130 g | 130 g | 150 g | 50 g | 50 g | 50 g |
| TEA | 6.9 g | 6.9 g | 6.9 g | 6.9 g | 6.9 g | 6.9 g |
| SW | 10 g | 10 g | 10 g | 10 g | 10 g | 10 g |
| PRD | — | 90 g | 10 g | 10 g | 10 g | 10 g |
| IPA | — | — | — | 150 g | — | — |
| MFG | — | — | — | — | 150 g | — |
| MS | — | — | — | — | — | 150 g |
| Finished amount* | 1 liter | 1 liter | 1 liter | 1 liter | 1 liter | 1 liter |

*All were made to a finished amount of 1 liter by adding water.
PRD: 2-Pyrrolidone
IPA: 2-Propanol
MFG: 1-Methoxy-2-propanol
MS: 2-Methoxyethanol Also, Cyan Ink Solution C-101 was prepared by increasing Cyan Dye (154) to 68 g in the formulation above.

[Formulation of Cyan Ink C-101]

| | |
|---|---|
| (Solid Contents) | |
| Cyan Dye (154) of the present invention | 68 g/liter |
| Benzotriazole (BTZ) | 0.08 g/liter |
| PROXEL XL2 | 3.5 g/liter |
| (Liquid Components) | |
| Diethylene glycol | 150 g/liter |
| Glycerin | 130 g/liter |
| Triethylene glycol monobutyl ether | 130 g/liter |
| Triethanolamine | 6.9 g/liter |
| Surfynol STG | 10 g/liter |

Cyan Inks C-102 to C-106 were prepared by changing the ink formulation of C-101 as shown in Table 2 below.

These inks each was filled in a cyan ink-light cyan ink cartridge of Inkjet Printer PM-950C manufactured by Seiko Epson Corporation and by using the inks of PM-950C for other colors, a cyan monochromatic image was printed. The image was printed on inkjet paper Photo Gloss Paper EX produced by Fuji Photo Film Co., Ltd. used as the image-receiving sheet and evaluated on the ejection stability of ink and the image fastness.

(Evaluation Test)

1) As for the ejection stability, cartridges were set in the printer and after confirming the ejection of ink from all nozzles, the image was output on 20 sheets of A4-size paper and rated based on the following criteria:

A: Printing was not disordered from the start to the end of printing.

B: Printing was disordered in some outputs.

C: Printing was disordered from the start to the end of printing.

2) As for the image preservability, a cyan solid image printed sample was prepared and subjected to the following evaluations.

(1) In the evaluation of light fastness, the image density Ci immediately after printing was measured by a reflection densitometer X-Rite 310 and after the image was irradiated with xenon light (85,000 lx) for 10 days by using a weather meter manufactured by Atlas, the image density Cf was

TABLE 2

| | C-101 | C-102 | C-103 | C-104 | C-105 | C-106 |
|---|---|---|---|---|---|---|
| (154) | 68 g | 68 g | 68 g | 68 g | 68 g | 68 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | — | 150 g | 50 g | 50 g | 50 g |
| GR | 130 g | 150 g | 100 g | 70 g | 70 g | 70 g |
| TGB | 130 g | 100 g | 150 g | 20 g | 20 g | 20 g |
| TEA | 6.9 g | 6.9 g | 6.9 g | 6.9 g | 6.9 g | 6.9 g |
| SW | 10 g | 10 g | 10 g | 10 g | 10 g | 10 g |
| PRD | — | 100 g | 10 g | 10 g | 10 g | 10 g |
| IPA | — | — | — | 180 g | — | — |
| MFG | — | — | — | — | 180 g | — |
| MS | — | — | — | — | — | 180 g |
| Finished amount* | 1 liter | 1 liter | 1 liter | 1 liter | 1 liter | 1 liter |

*All were made to a finished amount of 1 liter by adding water.

again measured. Then, the dye residual ratio Cf/Ci×100 was determined and evaluated. The dye residual ratio was evaluated at three points having a reflection density of 1, 1.5 and 2. The sample was rated A when the dye residual ratio was 70% or more at any density, rated B when less than 70% at two points, and rated C when less than 70% at all points.

(2) In the evaluation of heat fastness, the density was measured by X-Rite 310 before and after the sample was stored for 10 days under the conditions of 80° C. and 15% RH, and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

(3) In the evaluation of ozone resistance, the photo gloss paper having formed thereon an image was left standing for 7 days in a box set to an ozone gas concentration of 0.5 ppm and the image density before and after standing in the ozone gas atmosphere was measured by a reflection densitometer (X-Rite 310TR) and evaluated as the dye residual ratio. The dye residual ratio was measured at three points having a reflection density of 1, 1.5 and 2.0. The ozone gas concentration in the box was set by using an ozone gas monitor (Model OZG-EM-01) manufactured by APPLICS.

The sample was rated on a scale of three stages, namely, rated A when the dye residual ratio was 80% or more at any density, rated B when less than 80% at one or two point(s), and rated C when less than 70% at all points.

3) As for the blurring of the image under high-humidity condition, a printing pattern where four cyan square patterns each in a size of 3 cm×3 cm were arrayed to form a two-line and two-column table shape with a 1-mm white clearance between respective square patterns was prepared and after this image sample was stored under conditions of 25° C. and 90% RH for 72 hours, the bleeding of cyan dye in the white clearance was observed. The sample was rated A when the increase of cyan density in the white clearance based on the density immediately after printing was less than 0.01 as measured by a cyan filter of Status A, rated B when from 0.01 to 0.05, and rated C when more than 0.05.

The results obtained are shown in Table 3 below.

TABLE 3

| | Ejection Stability | Light Fastness | Heat Fastness | $O_3$ Resistance | C Bleeding |
|---|---|---|---|---|---|
| Genuine ink of EPSON (PM-950) | A | C | B | C | B |
| LC-101, C-101 (Reference Example) | A | A | A | A | C |
| LC-102, C-102 (Reference Example) | A | A | A | A | C |
| LC-103, C-103 (Reference Example) | A | A | A | A | C |
| LC-104, C-104 (Invention) | A | A | A | A | A |
| LC-105, C-105 (Invention) | A | A | A | A | A |
| LC-106, C-106 (Invention) | A | A | A | A | A |

As seen from the results in the Table, the systems using the ink set of the present invention containing both an organic solvent having a boiling point of 150° C. or more and an organic solvent having a boiling point of less than 150° C. were decreased in the bleeding as compared with Reference Examples not containing these organic solvents at the same time, and also surpassed the genuine ink of EPSON in view of both the fastness of image and the blurring of image.

(Ink Containing a Water-miscible Organic Solvent which is a Mixture of Two or More Members where at Least One Member Contains a Polyhydric Alcohol and/or a Derivative Thereof, at a Concentration of 10 to 60 (Mass/Volume) %)

Example 2

Deionized water was added to the following components to make 1 liter and the resulting solution was stirred for 1 hour under heating at 30 to 40° C. and after adjusting the pH to 9 with 10 mol/liter of KOH, filtered under reduced pressure through a microfilter having an average pore size of 0.25 μm to prepare a light cyan ink solution.

| | |
|---|---|
| Cyan dye (Compound 154) of the present invention | 17.5 g/liter |
| Diethylene glycol | 164 g/liter |
| Glycerin | 123 g/liter |
| Triethylene glycol monobutyl ether | 119 g/liter |
| Triethanolamine | 6.5 g/liter |
| Benzotriazole | 0.07 g/liter |
| PROXEL XL2 | 3.5 g/liter |
| Surfactant (w-1) | 10 g/liter |

Furthermore, a cyan ink, a light magenta ink, a magenta ink, a yellow ink, a dark yellow ink and a black ink were prepared by changing the dye species and the additives, and Ink Set 101 shown in Table 4 below was prepared.

TABLE 4

| | Light Cyan | Cyan | Light Magenta | Magenta | Yellow | Dark Yellow | Black |
|---|---|---|---|---|---|---|---|
| Dye (g/liter) | 154 | 154 | A-1 | A-1 | A-3 | A-3 | A-5 |
| | 17.5 | 68.0 | 10.2 | 30.8 | 14.0 | 10.0 | 20.0 |
| | | | | | A-4 | A-4 | A-6 |
| | | | | | 14.0 | 10.0 | 39.0 |
| | | | | | | A-2 | A-7 |
| | | | | | | 13.0 | 17.0 |
| | | | | | | | A-3 |
| | | | | | | | 20.0 |

TABLE 4-continued

|  | Light Cyan | Cyan | Light Magenta | Magenta | Yellow | Dark Yellow | Black |
|---|---|---|---|---|---|---|---|
| Diethylene glycol (g/liter) | 167 | 110 | 47 | 76 | 85 | — | 20 |
| Urea (g/liter) | — | — | 37 | 46 | — | — | — |
| Glycerin (g/liter) | 164 | 148 | 198 | 150 | 154 | 147 | 120 |
| Triethylene glycol monobutyl ether (g/liter) | 125 | 132 | 105 | 107 | 130 | 127 | — |
| Diethylene glycol monobutyl ether (g/liter) | — | — | — | — | — | — | 230 |
| 2-Pyrrolidone (g/liter) | — | 20 | 40 | — | — | — | 80 |
| Surfactant (g/liter) | 10 | 10 | 6 | 12 | 3 | 3 | 5 |
| Triethanolamine (g/liter) | 6.5 | 10 | 7 | 7 | 1 | 1 | 18 |
| Benzotriazole (g/liter) | 0.07 | 0.09 | 0.07 | 0.08 | 0.06 | 0.08 | 0.08 |
| Proxel XL2 (g/liter) | 1.0 | 4.0 | 5.0 | 4.5 | 3 | 5 | 4 |
| Concentration of water-miscible organic solvent, (mass/volume) % | 46.25 | 42.0 | 39.7 | 34.0 | 37.0 | 27.5 | 46.8 |

Deionized water was added to make 1 liter.

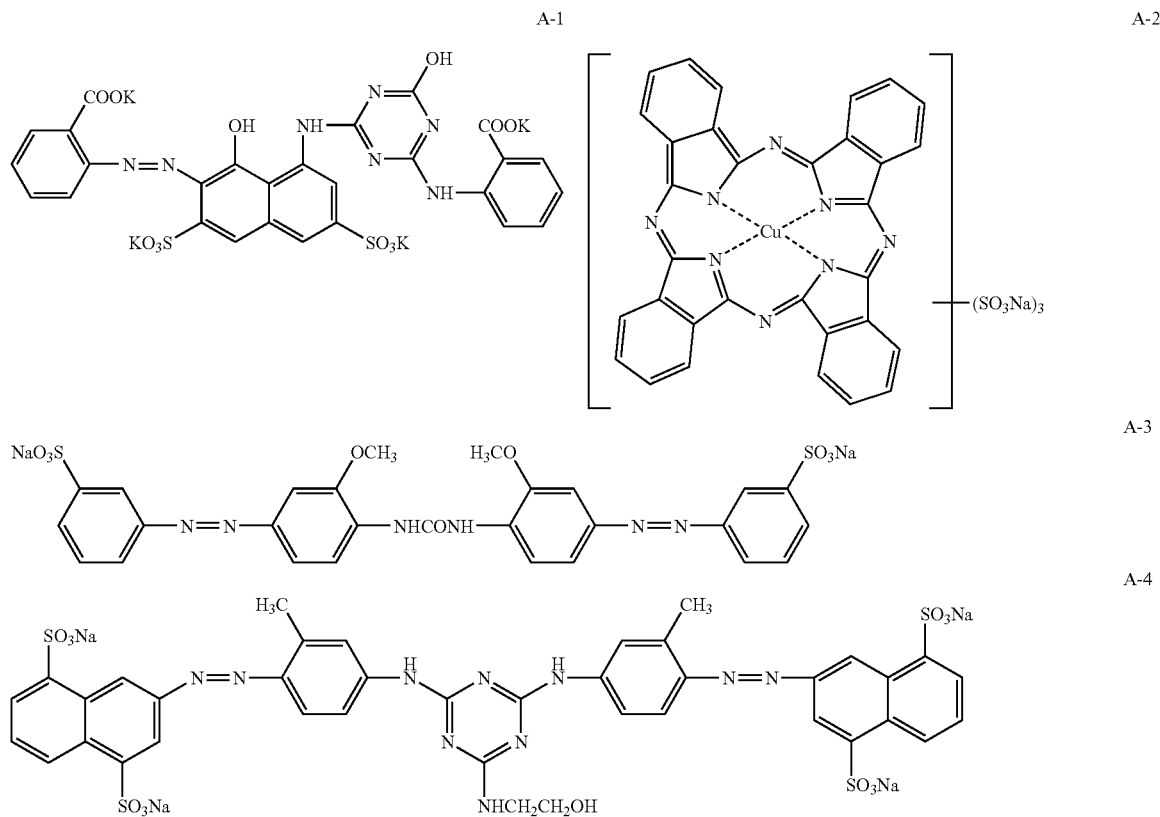

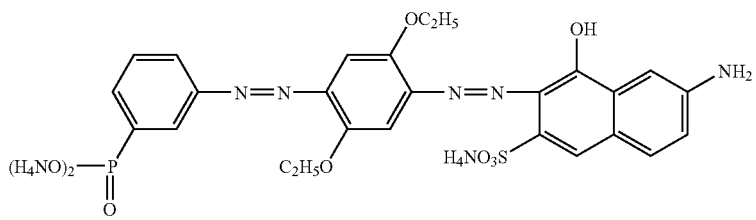

A-5

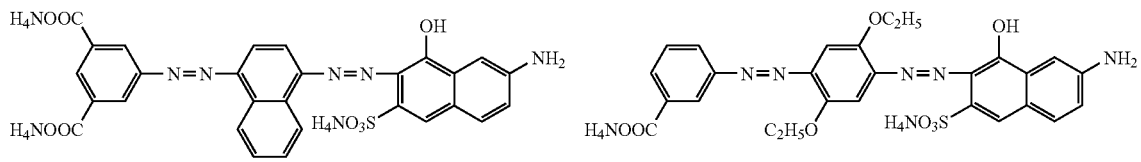

A-6        A-7

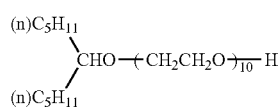

W-1

Ink Sets 102 to 110 were prepared by changing the dye species for light cyan ink and cyan ink and the concentration of water-miscible organic solvent in Ink Set 101 as shown in Table 5 below. The concentration of the water-miscible organic solvent was set by appropriately adjusting the amounts added of diethylene glycol, glycerin, triethylene glycol monobutyl ether, diethylene glycol monobutyl ether, 2-pyrrolidone and triethanolamine.

These ink sets 101 to 110 each was filled in cartridges of Inkjet Printer PM800C (manufactured by Seiko Epson Corporation) and an image was printed by this printer on inkjet paper Photo Gloss Paper EX produced by Fuji Photo Film Co., Ltd. and subjected to the following evaluations.

The "printing performance (1)" was evaluated in the same manner as the ejection stability of Example 1. The evaluation criteria were also the same as in Example 1.

TABLE 5

| Ink Set | | Presence or Absence of Polyhydric Alcohol | Light Cyan (%) | Cyan (%) | Remarks |
|---|---|---|---|---|---|
| 101 | dye | present | 154 | 154 | Invention |
| | concentration of water-miscible organic solvent | | 46.25 | 42.0 | |
| 102 | dye | present | 154 | 154 | Invention |
| | concentration of water-miscible organic solvent | | 20.0 | 42.0 | |
| 103 | dye | present | 154 | 154 | Invention |
| | concentration of water-miscible organic solvent | | 46.25 | 20.0 | |
| 104 | dye | present | 154 | 154 | Invention |
| | concentration of water-miscible organic solvent | | 55.0 | 55.0 | |
| 105 | dye | present | 154 | 154 | Invention |
| | concentration of water-miscible organic solvent | | 20.0 | 20.0 | |
| 106 | dye | present | 154 | 154 | Reference |
| | concentration of water-miscible organic solvent | | 5.0 | 42.0 | |
| 107 | dye | present | 154 | 154 | Reference |
| | concentration of water-miscible organic solvent | | 5.0 | 5.0 | |
| 108 | dye | present | 154 | 154 | Reference |
| | concentration of water-miscible organic solvent | | 70.0 | 70.0 | |
| 109 | dye | none | 154 | 154 | Reference |
| | concentration of water-miscible organic solvent | | 46.25 | 42.0 | |
| 110 | dye | present | A-2 | A-2 | Comparison |
| | concentration of water-miscible organic solvent | | 46.25 | 42.0 | |

As for the "printing performance (2)", the cartridge was left standing at 60° C. for 2 days and thereafter, the disorder of printing was evaluated in the same manner as in the printing performance (1).

As for the "drying property", the image was touched with a finger immediately after printing and the staining was evaluated with an eye.

As for the fineline blurring, yellow, magenta, cyan and black fineline patterns were printed and the "fineline blurring (1)" was evaluated with an eye. In the case of black, the magenta ink was solid-printed, then finelines of black were printed, and the "fineline blurring (2)" due to contact of two colors was evaluated.

As for the "water resistance", the obtained image was immersed in deionized water for 10 seconds and then the blurring of image was evaluated.

As for the image preservability, a cyan solid image printed sample was prepared and subjected to the following evaluations.

In the evaluation of "light fastness", the image density Ci immediately after printing was measured by a reflection densitometer (X-Rite 310TR) and after the image was irradiated with xenon light (85,000 lx) for 7 days by using a weather meter manufactured by Atlas, the image density Cf was again measured. Then, the dye residual ratio Ci/Cf*100 was determined and evaluated. The dye residual ratio was evaluated at three points having a reflection density of 1, 1.5 and 2. The sample was rated A when the dye residual ratio was 85% or more at any density, rated B when less than 85% at two points, and rated C when less than 85% at all points.

In the evaluation of "heat fastness", the density was measured by a reflection densitometer (X-Rite 310TR) before and after the sample was stored for 7 days under the conditions of 70 to 80% RH and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

In the evaluation of "ozone resistance", the density was measured by a reflection densitometer (X-Rite 310TR) before and after the sample was stored for 7 days under the conditions of ventilation and heating at 80° C. and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

The results obtained are shown in Tables 6 and 7 below.

TABLE 6

| Ink Set | Printing Performance 1 | Printing Performance 2 | Drying Property | Fineline Blurring 1 | Fineline Blurring 2 | Water Resistance |
|---|---|---|---|---|---|---|
| 101 | A | A | ○ | ○ | ○ | ○ |
| 102 | A | A | ○ | ○ | ○ | ○ |
| 103 | A | A | ○ | ○ | ○ | ○ |
| 104 | A | A | ○ | ○ | ○ | ○ |
| 105 | A | A | ○ | ○ | ○ | ○ |
| 106 | B | C | ○ | ○ | ○ | ○ |
| 107 | B | C | ○ | ○ | ○ | ○ |
| 108 | B | B | X | ○ | ○ | X |
| 109 | C | C | ○ | ○ | ○ | ○ |
| 110 | A | B | ○ | ○ | ○ | ○ |

TABLE 7

| Ink Set | Light Fastness | Heat Fastness | Gas Resistance | Remarks |
|---|---|---|---|---|
| 101 | A | A | A | Invention |
| 102 | A | A | A | Invention |
| 103 | A | A | A | Invention |
| 104 | A | A | A | Invention |
| 105 | A | A | A | Invention |
| 106 | A | A | A | Reference |
| 107 | A | A | A | Reference |
| 108 | A | B | B | Reference |
| 109 | A | A | A | Reference |
| 110 | B | B | C | Comparison |

It is seen that the ink of the present invention is excellent in the printing performances (1) and (2) and therefore, reveals excellent ejection stability and also that excellent performance is exhibited regarding water resistance and fastness to light and heat. Furthermore, the ink of the present invention is excellent in the performance at the fineline output and free from fineline Incidentally, even when the image-receiving paper used in the present invention was changed to PM Photographic Paper produced by Seiko Epson Corporation or PR101 produced by Canon Inc., the same effects as in the results above were obtained.

Example 3

The same inks as prepared in Example 2 were filled in cartridges of Inkjet Printer BJ-F850 (manufactured by Canon Inc.) and an image was printed by this printer on inkjet paper Photo Gloss Paper EX produced by Fuji Photo Film Co., Ltd. and evaluated in the same manner as in Example 2. Then, the same results as in Example 2 were obtained. Even when the image-receiving paper was changed to PM Photographic Paper produced by Seiko Epson Corporation or PR101 produced by Canon Inc., the same effects were obtained.

Example 4

Dye (Compound 189) (7 g) and 4 g of sodium dioctylsulfosuccinate were dissolved in 6 g of High Boiling Point Organic Solvent (s-1), 10 g of High Boiling Point Organic Solvent (s-2) and 50 ml of ethyl acetate at 70° C. To the resulting solution, 500 ml of deionized water was added while stirring with magnetic stirrer to produce an oil-in-water type coarse particle dispersion.

This coarse particle dispersion was passed 5 times through Microfluidizer (manufactured by Microfluidex Inc.) under a pressure of 60 MPa, thereby performing the pulverization. From the finished emulsified product, the solvent was removed by a rotary evaporator until the odor of ethyl acetate was not generated.

To the thus-obtained finely emulsified product of oil-soluble dye, 140 g of diethylene glycol, 64 g of glycerin, 13 g of Surfactant (w-1) and additives such as urea were added. Thereafter, 900 ml of deionized water was added, the pH was adjusted to 9 with 10 mol/liter of KOH and the concentration of water-miscible organic solvent was adjusted to produce a light cyan ink shown in Table 8 below. The volume average particle size of the resulting emulsion-dispersed ink was measured by using Microtrac UPA (manufactured by Nikkiso K.K.) and found to be 58 nm.

Also, the magenta ink, light magenta ink, cyan ink, yellow ink, dark yellow ink and black ink of Ink Set 201 shown in Table 8 below were prepared by changing the dye species and high boiling point organic solvents used.

TABLE 8

|  | Light Cyan | Cyan | Light Magenta | Magenta | Yellow | Dark Yellow | Black |
|---|---|---|---|---|---|---|---|
| Dye (g/liter) | C-1 7.0 | C-1 35.0 | a-3 6.0 | a-3 20.0 | Y-1 28.0 | Y-1 10.0<br>C-1 10.0 | C-1 19.0<br>M-1 10.0<br>Y-1 14.0 |
| High Boiling Point Organic Solvent (g/liter) | S-1 6.0<br>S-2 10.0 | 25.0<br>45.0 | 4.0<br>6.0 | 14.0<br>25.0 | 20.0<br>35.0 | 20.0<br>35.0 | 30.0<br>53.0 |
| Sodium dioctyl-sulfosuccinate (g/liter) | 4.0 | 30.0 | 6.2 | 23.0 | 35.0 | 35.0 | 52.0 |
| Diethylene glycol (g/liter) | 140 | 140 | 130 | 140 | 130 | 130 | 120 |
| Urea (g/liter) | 46.0 | 46.0 | 46.0 | 46.0 | 46.0 | 46.0 | 46.0 |
| Glycerin (g/liter) | 64.0 | 64.0 | 64.0 | 64.0 | 64.0 | 64.0 | 64.0 |
| Triethanolamine (g/liter) | 10 | 10 | 10 | 10 | 10 | 10 | 10 |
| Benzotriazole (g/liter) | 0.08 | 0.08 | 0.08 | 0.08 | 0.08 | 0.08 | 008 |
| Surfactant W-1 (g/liter) | 13 | 13 | 13 | 13 | 13 | 13 | 13 |
| Proxel XL2 (g/liter) | 3.5 | 3.5 | 3.5 | 3.5 | 3.5 | 3.5 | 3.5 |
| Concentration of water-miscible organic solvent (%) | 21.4 | 21.4 | 20.4 | 21.4 | 20.4 | 20.4 | 19.4 |
| | | Deionized water was added to make 1 liter. | | | | | |
| Volume average particle size | 58 nm | 65 nm | 60 nm | 55 nm | 60 nm | 58 nm | 70 nm |

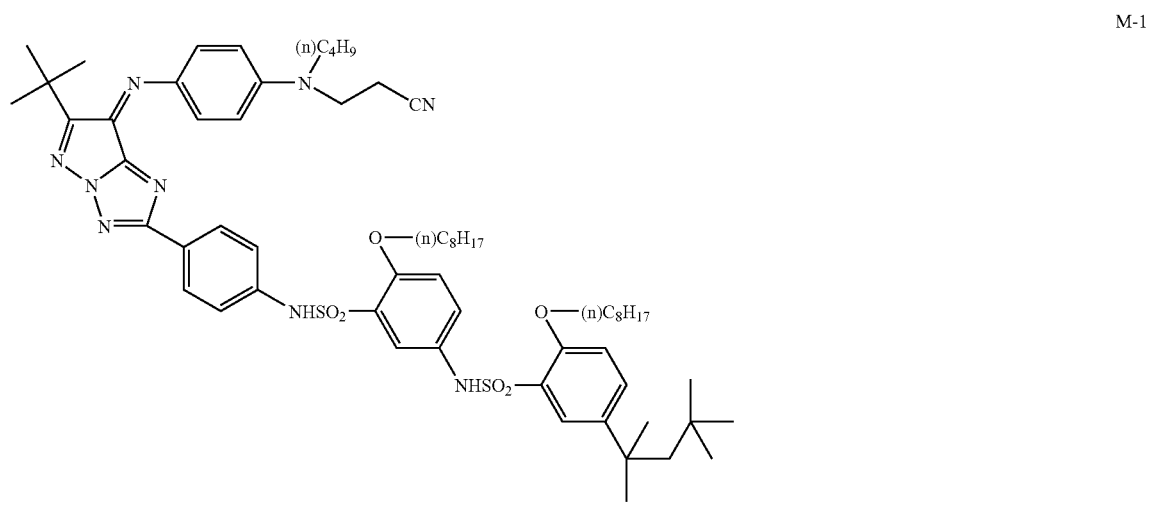

M-1

-continued

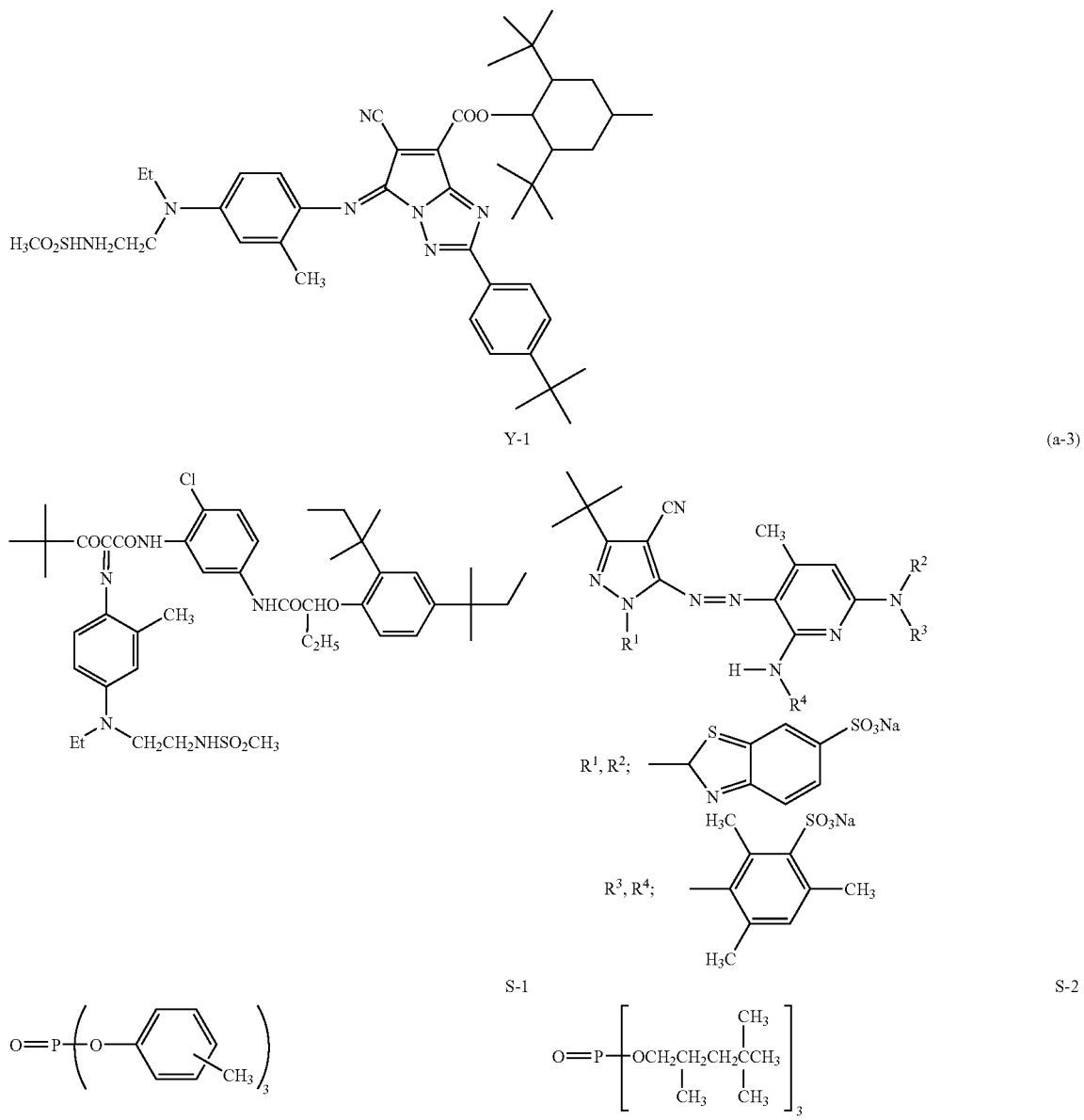

Also, Ink Sets 202 to 209 were prepared in the same manner as shown in Table 9 below.

Furthermore, Ink Set 210 for comparison was prepared according to the same formulation as Ink Set 201 except for changing the dye species to C-1. These Ink Sets 201 to 210 each was filled in cartridges of Inkjet Printer PM770C (manufactured by Seiko Epson Corporation) and an image was printed by this printer on inkjet paper Photo Gloss Paper EX produced by Fuji Photo Film Co., Ltd. and subjected to the same evaluations as in Example 2. The results obtained are shown in Table 9 below.

TABLE 9

| Ink Set | Dye | Concentration of Water-Miscible Organic Solvent (%) | Presence or Absence of Polyhydric Alcohol | Ejection Stability (1) | Light Fastness | Heat Fastness | Ozone Resistance | Water Resistance | Fineline Blurring (1) | Fineline Blurring (2) | Remarks |
|---|---|---|---|---|---|---|---|---|---|---|---|
| 201 | 189 | 20 | present | A | A | A | A | A | ○ | ○ | Invention |
| 202 | 189 | 30 | present | A | A | A | A | A | ○ | ○ | Invention |

TABLE 9-continued

| Ink Set | Dye | Concentration of Water-Miscible Organic Solvent (%) | Presence or Absence of Polyhydric Alcohol | Ejection Stability (1) | Light Fastness | Heat Fastness | Ozone Resistance | Water Resistance | Fineline Blurring (1) | Fineline Blurring (2) | Remarks |
|---|---|---|---|---|---|---|---|---|---|---|---|
| 203 | 189 | 40 | present | A | A | A | A | A | ◯ | ◯ | Invention |
| 204 | 182 | 30 | present | A | A | A | A | A | ◯ | ◯ | Invention |
| 205 | 180 | 40 | present | A | A | A | A | A | ◯ | ◯ | Invention |
| 206 | 187 | 50 | present | A | A | A | A | A | ◯ | ◯ | Invention |
| 207 | 189 | 5 | present | B | A | A | A | A | ◯ | ◯ | Reference |
| 208 | 189 | 70 | present | C | A | A | A | A | ◯ | ◯ | Reference |
| 209 | 189 | 30 | none | C | A | A | B | A | ◯ | ◯ | Reference |
| 210 | C-1 | 30 | present | A | A | A | B | A | ◯ | ◯ | Comparison |

It is seen that the ink of the present invention is excellent in all of ejection stability, weather resistance (light fastness, heat fastness and ozone resistance) and water resistance and can give a recorded image free from fineline blurring. The color hue obtained by the inks (201 to 206) of the present invention was good and equal to that of ink (210).

(Ink Containing a Water-Miscible Organic Solvent in which the Dye has a Solubility of 10 (g/100 g-Solvent) or More at 25° C., to a Content of 10 Mass % or Less in the Ink)

Example 5

Deionized water was added to the following components to make 1 liter and the resulting solution was stirred for 1 hour under heating at 30 to 40° C. and then filtered under reduced pressure through a microfilter having an average pore size of 0.25 μm to prepare a light cyan ink solution (LC-101)

[Formulation of Light Cyan Ink LC-101]

| (Solid Contents) | |
|---|---|
| Cyan Dye (154) of the present invention | 17.5 g/liter |
| Benzotriazole (BTZ) | 0.08 g/liter |
| PROXEL XL2 | 3.5 g/liter |
| (Liquid Components) | |
| Diethylene glycol (DEG) | 150 g/liter |
| Glycerin (GR) | 130 g/liter |
| Triethylene glycol monobutyl ether (TGB) | 130 g/liter |
| Triethanolamine (TEA) | 6.9 g/liter |
| Surfynol STG (SW) | 10 g/liter |

Inks LC-102 to LC-106 were prepared by changing the solvent species of LC-101 as shown in Table 10 below.

TABLE 10

|  | LC-101 | LC-102 | LC-103 | LC-104 | LC-105 | LC-106 |
|---|---|---|---|---|---|---|
| (154) | 17.5 g | 17.5 g | 17.5 g | 17.5 g | 17.5 g | 17.5 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | 150 g | 150 g | 150 g | 150 g | 100 g |
| GR | 130 g | 130 g | 130 g | 130 g | 130 g | 120 g |
| TGB | 130 g | — | 80 g | — | 40 g | 20 g |
| DGB | — | — | — | 150 g | 100 g | — |
| DGE | — | 150 g | 80 g | 6.9 g | 6.9 g | 6.9 g |
| MFG | — | — | — | — | 100 g | 250 g |
| TEA | 6.9 g | 6.9 g | 6.9 g | 6.9 g | 6.9 g | 6.9 g |
| SW | 10 g | 10 g | 10 g | 10 g | 10 g | 10 g |
| Finished amount* | 1 liter | 1 liter | 1 liter | 1 liter | 1 liter | 1 liter |
| D** | 13.7 | 15.7 | 16.7 | 0.7 | 4.7 | 2.7 |

*All were made to a finished amount of 1 liter by adding water.
**The concentration (mass %) of solvent in which Dye (154) has a solubility of 10 g/100 g-solvent or more at 25° C.
DGB: Diethylene glycol monobutyl ether
DGE: Diethylene glycol monoethyl ether
MFG: 1-Methoxy-2-propanol Solvent in which Dye (154) has a solubility of 10 g/100 g-solvent or more at 25° C.:

Three solvents, that is, TGB, DGE and TEA.

Also, Cyan Ink Solution C-101 was prepared by increasing Cyan Dye (154) to 68 g in the formulation above.

[Formulation of Cyan Ink C-101]

| (Solid Contents) | |
| --- | --- |
| Cyan Dye (154) of the present invention | 68 g/liter |
| Benzotriazole (BTZ) | 0.08 g/liter |
| PROXEL XL2 | 3.5 g/liter |
| (Liquid Components) | |
| Diethylene glycol | 150 g/liter |
| Glycerin | 130 g/liter |
| Triethylene glycol monobutyl ether | 130 g/liter |
| Triethanolamine | 6.9 g/liter |
| Surfynol STG | 10 g/liter |

Cyan Inks C-102 to C-106 were prepared by changing the ink formulation of C-101 as shown in Table 11 below.

TABLE 11

|  | C-101 | C-102 | C-103 | C-104 | C-105 | C-106 |
| --- | --- | --- | --- | --- | --- | --- |
| (154) | 68 g | 68 g | 68 g | 68 g | 68 g | 68 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 150 g | 150 g | 150 g | 150 g | 150 g | 100 g |
| GR | 130 g | 130 g | 130 g | 130 g | 130 g | 120 g |
| TGB | 130 g | — | 80 g | — | 40 g | 20 g |
| DGB | — | — | — | 150 g | 100 g | — |
| DGE | — | 150 g | 80 g | 6.9 g | 6.9 g | 6.9 g |
| MFG | — | — | — | — | 100 g | 250 g |
| TEA | 6.9 g | 6.9 g | 6.9 g | 6.9 g | 6.9 g | 6.9 g |
| SW | 10 g | 10 g | 10 g | 10 g | 10 g | 10 g |
| Finished amount* | 1 liter | 1 liter | 1 liter | 1 liter | 1 liter | 1 liter |
| D** | 13.7 | 15.7 | 16.7 | 0.7 | 4.7 | 2.7 |

These inks were evaluated on the ejection stability, image fastness and blurring of image under high-humidity condition in the same manner as in Example 1.

The results obtained are shown in Table 12 below.

TABLE 12

|  | Ejection Stability | Light Fastness | Heat Fastness | O₃ Resistance | C Bleeding |
| --- | --- | --- | --- | --- | --- |
| Genuine ink of EPSON (PM-950) | A | C | B | C | B |
| LC-101, C-101 (Reference Example) | A | A | A | A | C |
| LC-102, C-102 (Reference Example) | A | A | A | A | C |
| LC-103, C-103 (Reference Example) | A | A | A | A | C |
| LC-104, C-104 (Invention) | A | A | A | A | A |
| LC-105, C-105 (Invention) | A | A | A | A | A |

TABLE 12-continued

|  | Ejection Stability | Light Fastness | Heat Fastness | O₃ Resistance | C Bleeding |
| --- | --- | --- | --- | --- | --- |
| LC-106, C-106 (Invention) | A | A | A | A | A |

As seen from the results in Table 12, the systems using the ink set of the present invention were decreased in the bleeding as compared with Reference Examples and also surpassed the genuine ink of EPSON in view of both the fastness of image and the blurring of image.

(Ink Containing an Organic Solvent which is Liquid at Ordinary Temperature and does not Contain a Heteroatom Other than an Oxygen Atom)

Example 6

Deionized water was added to the following components to make 1 liter and the resulting solution was stirred for 1 hour under heating at 30 to 40° C. and then filtered under reduced pressure through a microfilter having an average pore size of 0.25 μm to prepare a light cyan ink solution (LC-101).

[Formulation of Light Cyan Ink LC-101]

| (Solid Contents) | |
| --- | --- |
| Cyan Dye (154) of the present invention | 17.5 g/liter |
| PROXEL | 3.5 g/liter |
| (Liquid Components) | |
| Diethylene glycol | 120 g/liter |
| Glycerin | 100 g/liter |
| Triethylene glycol monobutyl ether | 100 g/liter |
| 2-Pyrrolidone | 90 g/liter |
| Triethanolamine (TEA, pH adjusting agent) | 6.9 g/liter |
| Surfynol STG (SW, surfactant) | 10 g/liter |

Also, Cyan Ink Solution C-101 was prepared by increasing Cyan Dye (154) to 68 g in the formulation above.

[Formulation of Cyan Ink C-101]

| (Solid Contents) | |
| --- | --- |
| Cyan Dye (154) of the present invention | 68 g/liter |
| PROXEL | 3.5 g/liter |
| (Liquid Components) | |
| Diethylene glycol | 120 g/liter |
| Glycerin | 100 g/liter |
| Triethylene glycol monobutyl ether | 100 g/liter |
| 2-Pyrrolidone | 90 g/liter |
| Triethanolamine (TEA, pH adjusting agent) | 6.9 g/liter |
| Surfynol STG (SW, surfactant) | 10 g/liter |

Inks LC-102 to LC-106 and C-102 to C-106 having thoroughly the same composition as LC-101 and C-101 except for adding additives as shown in Tables 13 and 14 below were prepared.

These inks each was filled in a cyan ink-light cyan ink cartridge of Inkjet Printer PM-950C manufactured by Seiko Epson Corporation and by using the inks of PM-950C for other colors, a cyan monochromatic image was printed. The image was printed on inkjet paper Photo Gloss Paper EX produced by Fuji Photo Film Co., Ltd. used as the image-receiving sheet and evaluated on the ejection stability of ink, the image fastness and the blurring of image under high-humidity condition.

(Evaluation Test)

1) As for the ejection stability, cartridges were set in the printer and after confirming the ejection of ink from all nozzles, the printer was stored for 2 weeks under the conditions of 30° C. and 90% RH. Under these conditions, the image was output on 20 sheets of A4-size paper and rated based on the following criteria:

A: Printing was not disordered from the start to the end of printing.

B: Printing was disordered in some outputs.

C: Printing was disordered from the start to the end of printing.

TABLE 13

| | LC-101 | LC-102 | LC-103 | LC-104 | LC-105 | LC-106 |
| --- | --- | --- | --- | --- | --- | --- |
| 154 | 17.5 g | 17.5 g | 17.5 g | 17.5 g | 17.5 g | 17.5 g |
| PROXEL | 3.5 g | 3.5 g | 3.5 g | 3.5 g | 3.5 g | 3.5 g |
| DEG | 120 g | 120 g | 120 g | 120 g | 50 g | 140 g |
| GR | 100 g | 100 g | 100 g | 100 g | 100 g | 100 g |
| TGB | 100 g | 100 g | 100 g | 100 g | 50 g | — |
| PRD | 90 g | — | — | — | — | — |
| TEA | 6.9 g | 6.9 g | 6.9 g | 6.9 g | 6.9 g | 6.9 g |
| SW | 10 g | 10 g | 10 g | 10 g | 10 g | 10 g |
| DMI | — | 90 g | — | — | — | — |
| DMAc | — | — | 90 g | — | — | — |
| MFG | — | — | — | 90 g | — | — |
| DEB | — | — | — | — | 90 g | 130 g |
| Finished amount* | 1 liter | 1 liter | 1 liter | 1 liter | 1 liter | 1 liter |

*All were made to a finished amount of 1 liter by adding water.
DMI: 1,3-Dimethylimidazolidinone
DMAc: N,N-dimethylacetamide
MFG: 1-Methoxy-2-propanol
DEB: Diethylene glycol monobutyl ether

TABLE 14

| | C-101 | C-102 | C-103 | C-104 | C-105 | C-106 |
| --- | --- | --- | --- | --- | --- | --- |
| 154 | 23 g | 23 g | 23 g | 23 g | 23 g | 23 g |
| PROXEL | 3.5 g | 3.5 g | 3.5 g | 3.5 g | 3.5 g | 3.5 g |
| DEG | 120 g | 120 g | 120 g | 120 g | 50 g | 140 g |
| GR | 100 g | 100 g | 100 g | 100 g | 100 g | 100 g |
| TGB | 100 g | 100 g | 100 g | 100 g | 50 g | — |
| PRD | 90 g | — | — | — | — | — |
| TEA | 6.9 g | 6.9 g | 6.9 g | 6.9 g | 6.9 g | 6.9 g |
| SW | 10 g | 10 g | 10 g | 10 g | 10 g | 10 g |
| DMI | — | 90 g | — | — | — | — |
| DMAc | — | — | 90 g | — | — | — |
| MFG | — | — | — | 90 g | — | — |
| DEB | — | — | — | — | 90 g | 130 g |
| Finished amount* | 1 liter | 1 liter | 1 liter | 1 liter | 1 liter | 1 liter |

*All were made to a finished amount of 1 liter by adding water.

2) The image preservability was evaluated in the same manner as in Example 1.

3) The blurring of image under high-humidity condition was also evaluated in the same manner as in Example 1.

The results obtained are shown in Table 15 below.

TABLE 15

|  | Ejection Property | Light Fastness | Heat Fastness | $O_3$ Resistance | C Bleeding |
|---|---|---|---|---|---|
| Genuine ink of EPSON (PM-950) | A | B | B | C | B |
| LC-101, C-101 (Reference Example) | A | A | A | A | C |
| LC-102, C-102 (Reference Example) | A | A | A | A | C |
| LC-103, C-103 (Reference Example) | A | A | A | A | C |
| LC-104, C-104 (Invention) | A | A | A | A | A |
| LC-105, C-105 (Invention) | A | A | A | A | A |
| LC-106, C-106 (Invention) | A | A | A | A | A |

As seen from the results in Table 15, the systems using the ink set of the present invention surpassed Reference Examples in view of blurring of image and also surpassed the ink (genuine ink of PM-950C) of EPSON in view of fastness of dye.

(Ink Containing a Water-miscible Organic Solvent Having a Vapor Pressure of 2,000 Pa or Less at 20° C.)

Example 7

(Preparation of Ink Solution)

Deionized water was added to the following components to make 1 liter and the resulting solution was dissolved with stirring for 1 hour under heating at 30 to 40° C. and then filtered under reduced pressure through a microfilter having an average pore size of 0.25 μm to prepare a light cyan ink solution.

| Cyan Dye [154] | 17.5 g |
| Triethylene glycol monobutyl ether | 119.0 g |
| Glycerin | 123.0 g |
| Diethylene glycol | 164.0 g |
| PROXEL XL2 [produced by Zeneca] | 1.0 g |
| Benzotriazole | 0.07 g |
| Surfactant (polyethylene glycol (average number of repetitions of ethylene oxide: 10) terminated with 2-butyl octanoic acid ester at one end) | 10.0 g |

(Preparation of Ink Solution)

Deionized water was added to the following components to make 1 liter and the resulting solution was dissolved with stirring for 1 hour under heating at 30 to 40° C. and then filtered under reduced pressure through a microfilter having an average pore size of 0.25 μm to prepare a cyan ink solution.

| Cyan Dye [154] | 68.0 g |
| Triethylene glycol monobutyl ether | 127.0 g |
| Glycerin | 110.0 g |
| Diethylene glycol | 107.0 g |
| PROXEL XL2 [produced by Zeneca] | 4.0 g |
| Benzotriazole | 0.09 g |
| Surfactant (polyethylene glycol (average number of repetitions of ethylene oxide: 10) terminated with 2-butyl octanoic acid ester at one end) | 10.0 g |

Then, inks of Examples 8 and 9 and Comparative Examples 1 and 2 were prepared thoroughly in the same manner as the light cyan ink and cyan ink above except for changing the dye, water-miscible organic solvent species and amount as shown in Table 16 below.

TABLE 16

|  | Composition | Light Cyan | Cyan | Vapor Pressure [Pa] |
|---|---|---|---|---|
| Example 7 | Dye | (154) | (154) | — |
|  | Diethylene glycol | 164 | 107 | <1.3 (20° C.) |
|  | Glycerin | 123 | 110 | 0.3 (20° C.) |
|  | Triethylene glycol monobutyl ether | 119 | 127 | <1.3 (20° C.) |
| Example 8 | Dye | (154) | (154) | — |
|  | Diethylene glycol | 167 | 110 | <1.3 (20° C.) |
|  | Glycerin | 164 | 148 | 0.3 (20° C.) |
|  | Triethylene glycol monobutyl ether | 125 | 132 | <1.3 (20° C.) |
| Example 9 | Dye | (154) | (154) | — |
|  | Diethylene glycol | 164 | 107 | <1.3 (20° C.) |
|  | Glycerin | 123 | 110 | 0.3 (20° C.) |
|  | 1-Methoxy-2-propanol | 119 | 127 | 1013 (20° C.) |
| Comparative Example 1 | Dye | (C-1) | (C-1) | — |
|  | Diethylene glycol | 164 | 107 | <1.3 (20° C.) |
|  | Glycerin | 123 | 110 | 0.3 (20° C.) |
|  | Triethylene glycol monobutyl ether | 119 | 127 | <1.3 (20° C.) |
| Comparative Example 2 | Dye | (154) | (154) | — |
|  | 2-Propanol | 226 | 162 | 4320 (20° C.) |
|  | Ethylene glycol dimethyl ether | 181 | 182 | 6400 (20° C.) |

C-1:

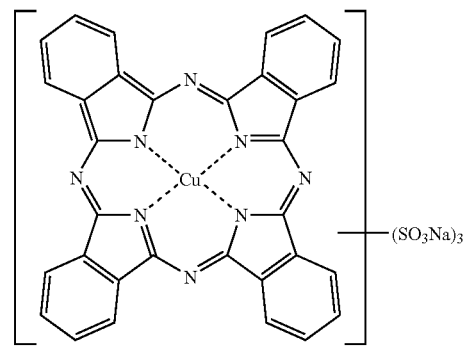

The light cyan inks and cyan inks produced above each was filled in a cartridge of Inkjet Printer PM920C (manufactured by Seiko Epson Corporation) and an image was printed by this printer on inkjet paper Photo Gloss Paper EX produced by Fuji Photo Film Co., Ltd. and subjected to the following evaluations. The results obtained are shown in Table 17.

(1) As for the ejection stability, cartridges were set in the printer and by performing a continuous ejection test of ink from nozzles, the ejection stability (1) was evaluated.

Furthermore, the ejection stability (2) after the printer was left standing at room temperature for 2 weeks in the state that the cartridges were set in the printer was also evaluated.

○: Stable.
Δ: Slightly unstable.
X: Unstable.

(2) As for the image preservability, a cyan solid image printed sample was prepared and subjected to the following evaluations.

In the evaluation of light fastness, the image density Ci immediately after printing was measured by a reflection densitometer (X-Rite 310TR) and after the image was irradiated with xenon light (85,000 lx) for 6 days by using a weather meter manufactured by Atlas, the image density Cf was again measured. Then, the dye residual ratio (100× Cf/Ci) was determined and evaluated. The dye residual ratio was evaluated at three points having a reflection density of 1, 1.5 and 2. The sample was rated A when the dye residual ratio was 80% or more at any density, rated B when less than 80% at two points, and rated C when less than 80% at all points.

In the evaluation of heat fastness, the density was measured by a reflection densitometer (X-Rite 310TR) before and after the sample was stored for 5 days under the conditions of 80° C. and 70% RH and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

The ozone resistance was evaluated in the same manner as in Example 2.

The results obtained are shown in Table 17 below.

TABLE 17

| Ink | Dye | Ejection Stability (1) | Ejection Stability (2) | Light Fastness | Heat Fastness | Ozone Resistance |
|---|---|---|---|---|---|---|
| Example 7 | (154) | ○ | ○ | A | A | A |
| Example 8 | (154) | ○ | ○ | A | A | A |
| Example 9 | (154) | ○ | ○ | A | A | A |
| Comparative Example 1 | (c-1) | ○ | ○ | C | A | C |
| Comparative Example 2 | (154) | ○ | X | A | A | A |

It is seen that when the ink of the present invention is used, excellent ejection stability can be obtained and excellent performance is also exhibited regarding the fastness.

The color hue obtained by the inks of the present invention was equal to that of the ink of Comparative Example 1.

Also, when inks of the present invention were prepared by using other water-soluble dyes represented by formula (I) in place of the cyan dye (154) in this Example, the same effects as above were obtained on the weather resistance, ejection stability and color hue.

Incidentally, even when the image-receiving paper used in the present invention was changed to PM Photographic Paper produced by Seiko Epson Corporation or PR101 produced by Canon Inc., the same effects as in the results above were obtained.

(Effects of the Invention)

According to the present invention, an inkjet recording ink and an inkjet recording method are provided, in which the ink is an aqueous ink advantageous in view of handleability, odor, safety and the like and where high ejection stability, good color hue and excellent fastness to weather and water can be ensured and a recorded image with high image quality can be obtained.

INDUSTRIAL APPLICABILITY

The ink of the present invention is not limited in the inkjet recording system and can be used for a known system, for example, an electric charge controlling system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink, and the ink of the present invention can be used for all of these systems.

The invention claimed is:

1. An inkjet recording ink comprising an aqueous medium having dissolved therein a phthalocyanine dye, wherein said phthalocyanine dye has an ionic hydrophilic group and is a water-soluble dye having an oxidation potential more positive than 1.0 V (vs SCE) and the ink comprises a water-miscible organic solvent having a vapor pressure of 2,000 Pa or less at 20° C.

wherein said phthalocyanine dye is represented by the following formula (I):

Formula (I):

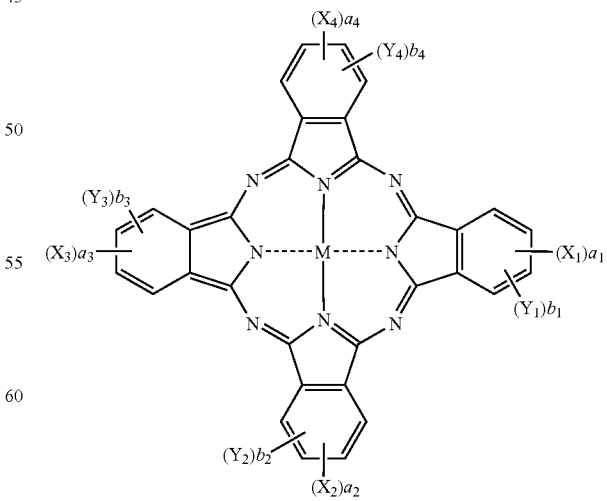

wherein $X_1$, $X_2$, $X_3$ and $X_4$ each independently represents —SO-Z, —SO$_2$-Z, —SO$_2$NR1R2, a sulfo group, —CONR1R2 or —CO$_2$R1, and at least one of $X_1$, $X_2$, $X_3$ and $X_4$ represents —SO$_2$-Z or —SO$_2$NR1R2;

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, these may be the same or different, $Y_1$, $Y_2$, $Y_3$ and $Y_4$ each independently represents a monovalent substituent, provided that when a plurality of $X_1$s, $X_2$s, $X_3$s, $X_4$s, $Y_1$s, $Y_2$s, $Y_3$s or $Y_4$s are present, these may be the same or different, $a_1$ to $a_4$ and $b_1$ to $b_4$ represent the number of substituents $X_1$ to $X_4$ and $Y_1$ to $Y_4$, respectively, $a_1$ to $a_4$ each independently represents an integer of 0 to 4 but all are not 0 at the same time, $b_1$ to $b_4$ each independently represents an integer of 0 to 4, and M represents a hydrogen atom, a metal atom or an oxide, hydroxide or halide thereof.

2. The inkjet recording ink as claimed in claim 1, which comprises at least one organic solvent having a boiling point of 150° C. or more as the water-miscible organic solvent.

3. The inkjet recording ink as claimed in claim 2, wherein the at least one organic solvent having a boiling point of 150° C. or more is an alcohol derivative.

4. The inkjet recording ink as claimed in claim 1, which comprises at least one organic solvent having a boiling point of less than 150° C. as the water-miscible organic solvent.

5. The inkjet recording ink as claimed in claim 4, wherein the at least one organic solvent having a boiling point of less than 150° C. is an alcohol derivative.

6. The inkjet recording ink as claimed in claim 1, which comprises a polyhydric alcohol and/or a derivative thereof as the water-miscible organic solvent.

7. The inkjet recording ink as claimed in claim 6, which comprises a mixture of two or more members containing the polyhydric alcohol and/or a derivative thereof.

8. The inkjet recording ink as claimed in claim 6 or 7, which comprises the polyhydric alcohol and/or a derivative thereof at a concentration of 10 to 60 (mass/volume) %.

9. The inkjet recording ink as claimed in claim 1, which comprises an organic solvent, in which the phthalocyanine dye has a solubility of 10 (g/100 g-solvent) or more at 250° C., as the water-miscible organic solvent.

10. The inkjet recording ink as claimed in claim 9, which comprises a water-miscible organic solvent, in which the phthalocyanine dye has a solubility of 10 (g/100 g-solvent) or more at 250° C., in an amount of 10 mass % or less in the ink.

11. The inkjet recording ink as claimed in claim 1, which comprises an organic solvent, which is liquid at ordinary temperature and does not contain a heteroatom other than an oxygen atom, as the water-miscible organic solvent.

12. The inkjet recording ink as claimed in claim 11, wherein the organic solvent has a boiling point of 150° C. or more.

13. The inkjet recording ink as claimed in claim 1, wherein the organic solvent is an alcohol derivative and is selected from a monool, a diol and a triol.

14. The inkjet recording ink as claimed in claim 1, wherein the water content is from 40 to 80 mass % based on the ink solution.

15. The inkjet recording ink as claimed in claim 1, wherein when the monochromatic moiety printed by using a single (cyan) color of the ink so as to give a cyan reflection density of 0.9 to 1.1 in a Status A filter is stored in an ozone environment of 5 ppm for 24 hours, a dye residual ratio (density after color fading/initial density×100) is 60% (preferably 80%) or more.

16. The inkjet recording ink as claimed in claim 1, wherein after color fading with ozone under the conditions of claim 15, the amount of Cu ion flowed out into water is 20% or less of all dyes.

17. The inkjet recording ink as claimed in claim 1, wherein the phthalocyanine dye is a water-soluble dye having an electron-withdrawing group at the β-position of a benzene ring of said phthalocyanine.

18. The inkjet recording ink as claimed in claim 1, wherein said phthalocyanine dye is a water-soluble phthalocyanine dye produced by a process not passing through sulfonation of an unsubstituted phthalocyanine.

19. The inkjet recording ink as claimed in claim 1, wherein the dye represented by formula (I) is a dye represented by the following formula (II):

Formula (II):

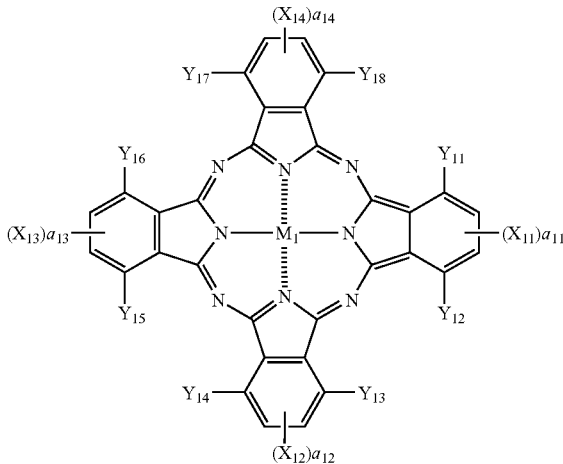

wherein $X_{11}$ to $X_{14}$, and $M_1$ have the same meanings as $X_1$ to $X_4$, and M in formula (I), respectively, provided that when a plurality of $X_{11}$s to $X_{14}$s are present, a plurality of substituents $X_{11}$, $X_{12}$, $X_{13}$ or $X_{14}$ may be the same or different;

$Y_{11}$ to $Y_{18}$ each represents a hydrogen atom or monovalent group;

$a_{11}$ to $a_{14}$ represent the number of substituents $X_{11}$ to $X_{14}$ and each independently represents an integer of 1 or 2.

20. An inkjet recording method comprising using the inkjet recording ink claimed in claims 1.

21. An inkjet recording method comprising ejecting ink droplets according to recording signals on an image-receiving material comprising a support having thereon an image-receiving layer containing a white inorganic pigment particle, thereby recording an image on the image-receiving material, wherein said ink droplet comprises the inkjet recording ink claimed in claim 1.

22. The inkjet recording ink as claimed in claim 19, wherein $Y_{11}$ to $Y_{18}$ each independently represents a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group, or a sulfo group.

23. The inkjet recording ink as claimed in claim 1, wherein the water-miscible organic solvent is present in an amount of from 10 to 50 mass % of the inkjet recording ink.

* * * * *